United States Patent
Makino et al.

(10) Patent No.: US 10,818,963 B2
(45) Date of Patent: Oct. 27, 2020

(54) SOLID ELECTROLYTE COMPOSITION, ELECTRODE SHEET FOR ALL-SOLID-STATE SECONDARY BATTERY, ALL-SOLID-STATE SECONDARY BATTERY, AND METHODS FOR MANUFACTURING ELECTRODE SHEET FOR ALL-SOLID-STATE SECONDARY BATTERY AND ALL-SOLID-STATE SECONDARY BATTERY

(71) Applicant: FUJIFILM Corporation, Tokyo (JP)

(72) Inventors: Masaomi Makino, Kanagawa (JP); Hiroaki Mochizuki, Kanagawa (JP); Tomonori Mimura, Kanagawa (JP); Katsuhiko Meguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/826,831

(22) Filed: Nov. 30, 2017

(65) Prior Publication Data

US 2018/0083307 A1 Mar. 22, 2018

Related U.S. Application Data

(63) Continuation of application No. PCT/JP2016/067036, filed on Jun. 8, 2016.

(30) Foreign Application Priority Data

Jun. 8, 2015 (JP) .................... 2015-116163

(51) Int. Cl.
*H01M 10/056* (2010.01)
*H01M 4/62* (2006.01)
(Continued)

(52) U.S. Cl.
CPC ....... *H01M 10/056* (2013.01); *H01M 2/1626* (2013.01); *H01M 4/13* (2013.01);
(Continued)

(58) Field of Classification Search
CPC ........... H01M 10/052; H01M 10/0525; H01M 10/056; H01M 10/0562;
(Continued)

(56) References Cited

U.S. PATENT DOCUMENTS

| 4,828,945 A * | 5/1989 | Nagata ..................... C08K 3/16 |
| | | 429/306 |
| 2005/0026043 A1* | 2/2005 | Kang ................. H01M 10/052 |
| | | 429/330 |

(Continued)

FOREIGN PATENT DOCUMENTS

| CN | 102187500 A | 9/2011 |
| JP | 2002-260663 A | 9/2002 |

(Continued)

OTHER PUBLICATIONS

Scientific and Technical Information Center (STIC) search results by Sam Darwish. (Year: 2019).*

(Continued)

*Primary Examiner* — Victoria H Lynch
(74) *Attorney, Agent, or Firm* — Sughrue Mion, PLLC

(57) ABSTRACT

Provided are a solid electrolyte composition containing an inorganic solid electrolyte having ion conductivity of ions of metals belonging to Group I or II of the periodic table, linear structures having an average diameter of 0.001 to 1 μm, an average length of 0.1 to 150 μm, a ratio of the average length to the average diameter of 10 to 100,000, and an electric conductivity of $1\times10^{-6}$ S/m or less, and organic solvents, an electrode sheet for an electric state secondary battery and an all-solid state secondary battery for which the solid electro- (Continued)

lyte composition is used, and methods for manufacturing an electrode sheet for an all-solid state secondary battery and an all-solid state secondary battery.

11 Claims, 1 Drawing Sheet

(51) Int. Cl.
| | |
|---|---|
| *H01M 10/0562* | (2010.01) |
| *H01M 10/052* | (2010.01) |
| *H01M 2/16* | (2006.01) |
| *H01M 4/13* | (2010.01) |
| *H01M 4/505* | (2010.01) |
| *H01M 4/525* | (2010.01) |
| *H01M 4/587* | (2010.01) |
| *H01M 10/0525* | (2010.01) |

(52) U.S. Cl.
CPC .......... *H01M 4/505* (2013.01); *H01M 4/525* (2013.01); *H01M 4/587* (2013.01); *H01M 4/62* (2013.01); *H01M 10/052* (2013.01); *H01M 10/0525* (2013.01); *H01M 10/0562* (2013.01); *H01M 2300/0068* (2013.01); *H01M 2300/0082* (2013.01); *H01M 2300/0091* (2013.01); *Y02P 70/50* (2015.11); *Y02T 10/70* (2013.01)

(58) Field of Classification Search
CPC . H01M 2300/0068; H01M 2300/0082; H01M 2300/0091; H01M 2/1626; H01M 4/13; H01M 4/505; H01M 4/525; H01M 4/587; H01M 4/62
See application file for complete search history.

(56) References Cited

U.S. PATENT DOCUMENTS

| | | | |
|---|---|---|---|
| 2010/0151335 A1* | 6/2010 | Senga | H01B 1/122 429/322 |
| 2012/0225351 A1 | 9/2012 | Kojima | |
| 2014/0248537 A1 | 9/2014 | Hayashi et al. | |
| 2014/0255780 A1* | 9/2014 | Mikhaylik | H01M 2/1626 429/213 |

FOREIGN PATENT DOCUMENTS

| | | |
|---|---|---|
| JP | 2007-273436 A | 10/2007 |
| JP | 2008-021416 A | 1/2008 |
| JP | 2008-103258 A | 5/2008 |
| JP | 2013-08611 A | 1/2013 |
| JP | 2014-096311 A | 5/2014 |
| JP | 2016-031789 A | 3/2016 |
| KR | 10-2011-0082506 A | 7/2011 |
| WO | 2007/015409 A1 | 2/2007 |
| WO | 2013/042720 A1 | 3/2013 |
| WO | 2014138242 A1 | 9/2014 |
| WO | 2015/064464 A1 | 5/2015 |
| WO | 2016/190304 A1 | 12/2016 |

OTHER PUBLICATIONS

Machine Translation JP2008103258A (Year: 2008).*
International Preliminary Report on Patentability, dated Dec. 12, 2017 from the International Bureau in International application No. PCT/JP2016/067036.
Translation of Written Opinion of PCT/JP2016/067036 dated Aug. 9, 2016 [PCT/ISA/237].
Hiroyuki Yano, "Cellulosic Nanofiber Materials," Wood Industry, Oct. 1, 2008, vol. 63, No. 10, pp. 450-455 (8 pages).
International Search Report of PCT/JP2016/067036 dated Aug. 9, 2016.
Notification of Reason for Refusal dated Feb. 15, 2019 from the Korean Intellectual Property Office in application No. 10-2017-7036447.
Communication dated Jul. 24, 2019, from The China National Intellectual Property Administration in counterpart Application No. 201680032744.9.
Communication dated May 9, 2018, from European Patent Office in counterpart application No. 16807511.7.
Communication dated Mar. 12, 2019 from the Japanese Patent Office in counterpart application No. 2017-523669.
Communication dated Jun. 22, 2020, issued by the European Patent Office in corresponding Application No. 16 807 511.7.
Communication dated Jun. 15, 2020, issued by the State Intellectual Property Office of the P.R.C. in corresponding Application No. 201680032744.9.

* cited by examiner

SOLID ELECTROLYTE COMPOSITION, ELECTRODE SHEET FOR ALL-SOLID-STATE SECONDARY BATTERY, ALL-SOLID-STATE SECONDARY BATTERY, AND METHODS FOR MANUFACTURING ELECTRODE SHEET FOR ALL-SOLID-STATE SECONDARY BATTERY AND ALL-SOLID-STATE SECONDARY BATTERY

CROSS-REFERENCE TO RELATED APPLICATIONS

This application is a Continuation of PCT International Application No. PCT/JP2016/067036 filed on Jun. 8, 2016, which claims priority under 35 U.S.C. § 119 (a) to Japanese Patent Application No. 2015-116163 filed in Japan on Jun. 8, 2015. Each of the above applications is hereby expressly incorporated by reference, in its entirety, into the present application.

BACKGROUND OF THE INVENTION

1. Field of the Invention

The present invention relates to a solid electrolyte composition, an electrode sheet for an all-solid state secondary battery, an all-solid state secondary battery, and methods for manufacturing an electrode sheet for an all solid state secondary battery and an all-solid state secondary battery.

2. Description of the Related Art

For lithium ion batteries, electrolytic solutions have been used. Attempts are underway to produce all-solid state secondary batteries in which all constituent materials are solid by replacing the electrolytic solutions with solid electrolytes. Reliability in terms of all performance of batteries is an advantage of techniques of using inorganic solid electrolytes. For example, to electrolytic solutions being used for lithium ion secondary batteries, flammable, materials such as carbonate-based solvents are applied as media. In secondary batteries for which the above-described electrolytic solutions are used, a variety of safety measures are employed. However, there may be a concern that disadvantages may be caused during overcharging and the like, and there is a demand for additional efforts. All-solid state secondary batteries in which non-flammable electrolytes can be used are considered as a fundamental solution therefor.

Another advantage of all-solid state secondary batteries is the suitability for increasing energy density by means of the stacking of electrodes. Specifically, it is possible to produce batteries having a structure in which electrodes and electrolytes are directly arranged in series. At this time, metal packages sealing battery cells and copper wires or bus-bars connecting battery cells may not be provided, and thus the energy density of batteries can be significantly increased. In addition, favorable compatibility with materials for positive electrode capable of increasing potentials and the like can also be considered as advantages.

Due to the respective advantages described above, all-solid state secondary batteries are being developed as next-generation lithium ion batteries (New Energy and Industrial Technology Development Organization (NEDO), Fuel Cell and Hydrogen Technologies Development Department, Electricity Storage Technology Development Section, "NEDO 2013 Roadmap for the Development of Next Generation Automotive Battery Technology" (August, 2013). For example, JP2013-008611A describes an all-solid state secondary battery produced using a binding agent made of a particulate polymer containing a surfactant having a polyoxyethylene chain in order to suppress an increase in interface resistance between solid particles, between solid particles and collectors, and the like.

SUMMARY OF THE INVENTION

In the all-solid state secondary battery described in JP2013-08611A, the interface resistance is suppressed. However, since the particulate polymer and the solid particles adhere to each other at points, the followability with respect to the expansion and contraction of active materials caused by repetitive charging and discharging is not sufficient, and there is a demand for improving the cycle characteristics.

Therefore, an object of the present invention is to provide a solid electrolyte composition capable of providing all-solid state secondary batteries having low resistance and excellent cycle characteristics, an electrode sheet for an all-solid state secondary battery and an all-solid state secondary battery for which the solid electrolyte composition is used, and methods for manufacturing an electrode sheet for an all-solid state secondary battery and an all-solid state secondary battery.

As a result of intensive studies, the present inventors and the like found that the use of a solid electrolyte composition containing a specific linear structure having a high aspect ratio enables the realization of all-solid state secondary batteries having low resistance and excellent cycle characteristics. This is considered to be attributed to the following reasons although partially based on assumption. That is, in layers obtained using a solid electrolyte composition of the present invention, linear structures twist together and thus form a network-like structure. Active material particles and inorganic solid electrolyte particles are trapped in this network-like structure, and thus, even in the case of the expansion and contraction of active materials caused by the driving of the all-solid state secondary battery, the peeling of an inorganic solid electrolyte are sufficiently ensured, and lithium ion conduction is not impaired. The present invention is based on the above-described finding.

That is, the object is achieved by the following means.

(1) A solid electrolyte composition comprising: an inorganic solid electrolyte having ion conductivity of ions of metals belonging to Group I or II of the periodic table; linear structures having an average diameter of 0.001 to 1 µm, an average length of 0.1 to 150 µm, a ratio of the average length to the average diameter of 10 to 100,000, and an electric conductivity of $1 \times 10^{-6}$ S/m or less; and an organic solvent.

(2) The solid electrolyte composition according to (1), in which the inorganic solid electrolyte is a sulfide-based inorganic solid electrolyte.

(3) The solid electrolyte composition according to (1) or (2), in which at least one linear structure contains a nanofiber or a nanowire made of any one selected from the group consisting of organic substances, carbon, metal, ceramic, and glass.

(4) The solid electrolyte composition according to any one of (1) to (3), in which at least one linear structure is a substituted or unsubstituted cellulose nanofiber.

(5) The solid electrolyte composition according to any one of (1) to (4), in which a surface of at least one linear structure is coated with a polymer having a different structure from a central portion, and the polymer is at least one polymer selected from the group consisting of acrylic resins, urethane resins, amide resins, urea resins, imide resins, ester resins, silicone resins, hydrocarbon resins, ether resins, carbonate resins, and fluorine-containing resins.

(6) The solid electrolyte composition according to any one of (1) to (5), in which a moisture content of the solid electrolyte composition is 50 ppm or less.

(7) The solid electrolyte composition according to any one of (1) to (6), in which a boiling point of at least one organic solvent is 100° C. or higher.

(8) The solid electrolyte composition according to any one of (1) to (7), in which the organic solvent is at least one kind of an organic solvent selected from the group consisting of a hydrocarbon-based solvent, an ether compound solvent, and the number of carbon atoms is four or more in all of the organic solvents.

(9) The solid electrolyte composition according to any one of (1) to (8), further comprising: polymer particles, in which an average particle diameter φ of the polymer particles and an average length L of the linear structures satisfy a relationship represented by Expression (A).

$$L/1,000 \leq \phi < L \quad \text{Expression (A)}$$

(10) The solid electrolyte composition to (9), in which a total mass $W_B$ of the linear structures and a total mass $W_D$ of the polymer particles satisfy a relationship represented by Expression (B).

$$W_B/10 < W_D < 20 \times W_B \quad \text{Expression (B)}$$

(11) The solid electrolyte composition according to (5), in which the surface of the linear structure and the polymer coating the surface of the linear structure are bonded to each other through a covalent bond.

(12) The solid electrolyte composition according to any one of (1) to (11), in which a content ratio of the linear structures is 0.1% to 20% by mass of all solid components.

(13) The solid electrolyte composition according to any one of (1) to (12), further comprising: an electrode active material.

(14) A method for manufacturing an electrode sheet for an all-solid state secondary battery, the method comprising: applying a wet slurry of the solid electrolyte composition according to any one of (1) to (13).

(15) An electrode sheet for an all-solid state secondary battery comprising in this order: a positive electrode active material layer: a solid electrolyte layer; and a negative electrode active material layer, in which at least one layer of the positive electrode active material layer, the solid electrolyte layer, or the negative electrode active material layer contains an inorganic solid electrolyte having ion conductivity of ions of metals belonging to Group I or II of the periodic table and linear structures having an average diameter of 0.001 to 1 μm, an average length of 0.1 to 150 μm, a ratio of the average length to the average diameter of 10 to 100,000, and an electric conductivity of 1×10⁻⁶ S/m or less.

(16) An all-solid state secondary batter constituted using the electrode sheet for an all-solid state secondary battery according to (15).

(17) A method for manufacturing an all-solid state secondary battery, the method comprising: manufacturing an all-solid state secondary battery having a positive electrode active material layer, a solid electrolyte layer, and a negative electrode active material layer in this order through the manufacturing method according to (14).

In the present specification, numerical ranges expressed using "to" include numerical values before and after the "to" as the lower limit value and the upper limit value.

In the present specification, "acryl" that is simply expressed is used to refer to both methacryl and acryl.

The solid electrolyte composition of the present invention can be preferably used to manufacture all-solid state secondary batteries having low resistance and excellent cycle characteristics. In addition, the electrode sheet for an all-solid state secondary batteries having excellent performance described above. In addition, according to the manufacturing methods of the present invention, it is possible to efficiently manufacture the electrode sheet for an all-solid state secondary battery of the present invention and all-solid state secondary batteries having excellent performance described above.

The above-described and other characteristics and advantages of the present invention will be further clarified by the following description with appropriate reference to the accompanying drawings.

DESCRIPTION OF THE PREFERRED EMBODIMENTS

A solid electrolyte composition of the present invention contains an inorganic solid electrolyte having ion conductivity of ions of metals belonging to Group I or II of the periodic table, linear structures having an average diameter of 0.001 to 1 μm, an average length of 0.1 to 150 μm, a ratio of the average length to the average diameter of 10 to 100,000, and an electric conductivity of 1×10⁻⁶ S/m or less, and organic solvents.

Hereinafter, a preferred embodiment will be described.

<Preferred Embodiment>

Figure 1:
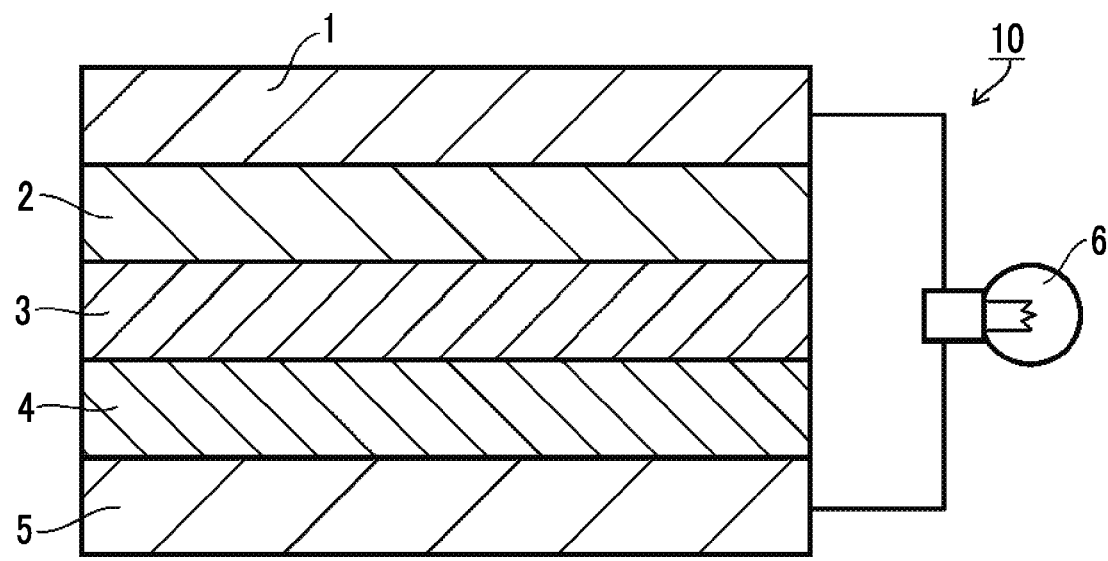
FIG. 1 is a vertical cross-sectional view schematically illustrating an all-solid state lithium ion secondary battery according to a preferred embodiment of the present invention.

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The respective layers are in contact with one another and have a laminated structure. In a case in which the above-described structure is employed, during charging, electrons (e⁻) are supplied to the negative electrode side, and lithium ions (Li⁺) are accumulated on the negative electrode side. On the other hand, during discharging, the lithium ions (Li⁺) accumulated on the negative electrode side return to the positive electrode, and electrons are supplied to an operation portion 6. In an example illustrated in the drawing, an electric bulb is employed as the operation portion 6 and is lit by discharging. The solid electrolyte composition of the present invention can be preferably used as a material used to form the negative electrode active material layer, the positive electrode active material layer, and the solid electrolyte layer.

The thicknesses of the positive electrode active material layer 4, the solid electrolyte layer 3, and the negative electrode active material layer 2 are not particularly limited. Meanwhile, in a case in which the dimensions of ordinary batteries are taken into account, the thicknesses are preferably 10 to 1,000 μm and more preferably 20 μm or more and less than 500 μm. In the all-solid state secondary battery of the present invention, the thickness of at least one layer of the positive electrode active material, layer 4, the solid electrolyte layer 3, or the negative electrode active material layer 2 is still more preferably 50 μm or more and less than 500 μm.

In the present specification, there are cases in which the positive electrode active material layer and the negative electrode active material layer are collectively referred to as electrode layers. In addition, as electrode active materials that are used in the present invention, there are a positive electrode active material that is included in the positive electrode active material layer and a negative electrode active material that is included in the negative electrode active material layer, and there are cases in which either or both layers are simply referred to as active materials or electrode active materials.

Hereinafter, the solid electrolyte composition which can be preferably used to manufacture an all-solid state secondary battery of the present invention will be described.

<Solid Electrolyte Composition>

(Linear Structures)

Linear structures that are used in the present invention refer to structures in which the average diameter D is 0.001 to 1 μm, the average length L is 0.1 to 150 μm, the aspect ratio L/D represented by the ratio of the average length to the average diameter is 10 to 100,000, and the electric conductivity is $1 \times 10^{-6}$ S/m or less.

The average diameter D is preferably 0.01 to 0.5 μm and more preferably 0.05 to 0.3 μm.

The average length L is preferably 1 to 50 μm and more preferably 5 to 30 μm.

The aspect ratio L/D is preferably 50 to 10,000 and more preferably 100 to 5,000.

Meanwhile, the average diameter D, the average length L, and the aspect ratio of the linear structures can be computed using a scanning electron microscope (SEM), a transmission electron microscope (TEM), or the like.

Regarding the specific measurement conditions and the like, the SEM analysis described in the section of examples can be referred to. In the present invention, the average diameter refers to the number-average diameter, and the average length refers to the number-average length. In addition, the aspect ratio refers to the aspect ratio of the number-average length to the number-average diameter.

In addition, the linear structures that are used in the present invention may be organic substances or inorganic substances, but need to have an electric conductivity of $1 \times 10^{-5}$ S/m or less and preferably $5 \times 10^{-7}$ S/m or less. Therefore, the linear structures are different from carbon nanofibers that can be used as auxiliary conductive agents.

Meanwhile, for the electric conductivity of the linear structures, the computation method in which the surface resistivity measured using a surface resistivity meter described in the section of examples is used can be referred to.

The linear structures that are used in the present invention may formed of one kind of materials or may be formed of two or more kinds of materials. In a case in which the linear structures are formed of two or more kinds of materials, the surfaces of the linear structures may be formed of a different material from that of the inside (central portions) of the linear structures, and examples thereof include linear structures having a surface coated with a different material from that of the central portions of the linear structures.

Here, the central portion of the linear structure is a portion capable of singly and independently forming the linear structure. The surface of the linear structure refers to the surface portion outside the central portion. Therefore, in a case in which the linear structures are formed of one kind of materials, the surfaces are not coated, and the linear structures are constituted of the central portion alone.

In a case in which a linear structure having the surface coated with a resin is considered as an example, the central portion of the linear structure is the linear structure that is to be coated with the resin, and the surface of the central portion is coated with the resin.

Since a three-dimensional network-like bridged structure is formed between the particles of the inorganic solid electrolyte particles, and the bonding between the particles can be effectively maintained even during battery driving, at least one linear structure preferably contains a nanofiber or a nanowire made of any one selected from the group consisting of organic substances, carbon, metal, ceramic, and glass and, among these, the central portion of the linear structure is more preferably a nanofiber or a nanowire made of any one selected from the group consisting of organic substances, carbon, metal, ceramic, and glass.

In a case in which the central portion is made of an organic substance, the surface may be coated with a different organic substance or may not be coated, and, in a case in which the central portion is made of an inorganic substance having an electric conductivity of $1 \times 10^{-6}$ S/m or less, the surface may be coated with an organic substance or may not be coated.

In a case in which the central portion is made of a semiconductor or a conductor having an electric conductivity of more than $1 \times 10^{-6}$ S/m, the surface is preferably coated with a material having an electric conductivity of $1 \times 10^{-6}$ S/m or less. Meanwhile, the electric conductivity of the linear structure may be $1 \times 10^{-6}$ S/m or less.

The material having an electric conductivity of $1 \times 10^{-6}$ S/m or less is preferably an organic substance, and the organic substance may be any one of a low-molecular-weight compound, an oligomer, and a polymer, but is preferably a polymer.

In a case in which the surfaces of the linear structures are coated, the surface coating ratio is preferably 0.1% to 1.000%, more preferably 1% to 100%, and still more preferably 5% to 50% with respect to 100% of the mass of the linear structures to be coated in terms of the mass ratio of the organic substance coating the surfaces.

Meanwhile, regarding the method for computing the surface coating ratio, the method for computing the surface coating ratio described in the section of examples can be referred to.

Not all of the surface of the central portion needs to be uniformly coated, and, as long as the electric conductivity of the linear structures is in the above-described preferred range, the surface may be partially coated and may have places in which the structure of the central portion forms the outermost surface.

Examples of the method for coating the surfaces of the linear structures with the organic substance include methods in which hydrogen bonds, sonic bonds, covalent bonds, intermolecular interaction, π-π interaction, hydrophobic interaction, or the like are used, and a method for coating the surface by forming covalent bonds is preferred.

Examples of the covalent bonds include bonds formed by a reaction between an —OH group present on the surface of the linear structure (the surface portion of the central portion of the linear structure) and a functional group in the organic substance coating the surface. Specifically, examples of covalent bonds formed in a case in which the functional group of the organic substance coating the surface is a —COOH group (or an active group such as a —COCl group) a —NCO group, an epoxy group, or an alkoxysilyl group include ester bonds, urethane bonds, carbon-carbon bonds, and siloxane bonds.

The reaction for forming the covalent bonds by a reaction between an —OH group present on the surface of the linear structure and a functional group in the organic substance coating the surface can be caused by applying reaction conditions for ordinary low-molecular-weight and high-molecular-weight organic synthesis reactions. Specific examples thereof include methods in which the linear structures are dispersed in a dispersion medium (an organic solvent described below or the like) and an organic substance activating a reaction for coating the surfaces is injected into the dispersion medium, thereby forming bonds, methods in which an organic substance activating a reaction for coating the surfaces is sprayed to the linear structures, and the like.

In a case in which the organic substance is a low-molecular-weight compound, examples of energy supply sources for forming the bonds include ultrasonic irradiation, active-ray irradiation (for example, UV, X-rays, excimer lasers, and electron beams), heating, and stirring. In addition, in a case in which the organic substance is an oligomer or a polymer, it is also possible to cause reactions by applying the same conditions as those for low-molecular-weight compounds.

In the present invention, since the polymer being present on the surfaces is capable of increasing the adhesiveness to the inorganic solid electrolyte, the surface of at least one linear structure is also preferably coated with a polymer having a different structure from that of the central portion of the linear structure. Meanwhile, in the present specification, there are cases in which polymers are mentioned as the same terminology as resins.

The polymer coating the surfaces is preferably at least one polymer selected from the group consisting of acrylic resins, urethane resins, amide resins, urea resins, imide resins, ester resins, silicone resins, hydrocarbon resins, ether resins, carbonate resins, and fluorine-containing resins, more preferably at least one polymer selected from the group consisting of acrylic resins, urethane resins, amide resins, urea resins, imide resins, and ester resins, and still more preferably an acrylic resin or a urethane resin.

As the acrylic resins, the specific examples of resins described in the section of the binder described below can be preferably applied. In addition, the acrylic resins are not particularly limited, and the acrylic resins described in JP2015-88486can also be preferably used.

The urethane resins, the amide resins, the urea resins, the imide resins, and the ester resins are not particularly limited, and, for example, the resins described in JP2015-88480A can be preferably used.

The silicone resins are not particularly limited, and, for example, modified resins having a functional group in a side chain or a terminal portion of dimethyl silicone can be preferably used. Examples of the functional group include carboxy groups, hydroxy groups, amino groups, epoxy groups, acryloyl groups, mercapto groups, carboxylic acid anhydride-containing groups, groups having a polyester bond, and the like, all of which can be procured from Shin-Etsu Chemical Co., Ltd.

Examples of the hydrocarbon resins include polyethylene, polypropylene, isoprene rubber, butadiene rubber, styrene butadiene rubber, hydrogenated styrene butadiene rubber, nitrile butadiene rubber, and hydrogenated nitrile butadiene rubber.

Examples of the ether resins include polyethylene glycol, polypropylene glycol, polybutylene glycol, and polyphenylene ether.

Examples of the carbonate resins include alkylene carbonate resins and the like.

As the fluorine-containing resins, the specific examples of resins described in the section of the binder described below can be preferably applied.

The above-exemplified resins preferably have a partially modified polar functional group (for example, a —COCl group or a —COBr group) or a reactive functional group (for example, a —COOH group, a —NCO group, an epoxy group, an alkoxysilyl group, or a halogenated alkyl group) in order to form bonds with the linear structures.

The method for synthesizing the polymer coating the surfaces is not particularly limited, and the polymer can be synthesized using an ordinary method. For example, polymers having a functional group that react with a —OH group in the linear structure can be synthesized by polymerizing monomers having a functional group that reacts with a —OH group in the linear structure.

The surfaces of the linear structures and the polymer coating the surfaces of the linear structures are preferably bonded to each other through covalent bonds in order to form stronger bonds. In this case, the polymer may have a functional group that reacts with a —OH group in the linear structure in either or both a side chain and a polymer terminal. Among these, the polymer preferably has the functional group that reacts with a —OH group in the linear structure in a polymer terminal since the reaction efficiency between a —OH group in the linear structure and the functional group that reacts with a —OH group in the linear structure improves, and the coating efficiency of the polymer that coats the surfaces of the linear structures increases.

The functional group equivalent of the functional group that reacts with a —OH group in the linear structure of the polymer coating the surfaces is not limited as long as the surfaces of the linear structures are coated with the reacted polymer. Here, the functional group equivalent refers to the molecular weight of a compound per functional group.

The functional group equivalent of the functional group that reacts with a —OH group in the linear structure of the polymer coating the surfaces is preferably 0.1 g/mmol to 100 g/mmol and more preferably 1 g/mmol to 10 g/mmol from the viewpoint of increasing the coating efficiency and increasing the coating intensity. In a case in which the functional group equivalent is in the above-described preferred range, the polymer coating the surfaces of the linear structures can be strongly bonded to the linear structures.

The mass average molecular weight of the polymer coating the surfaces is preferably 1,000 or more and 100,000 or less.

In a case in which the functional group that reacts with a —OH group in the linear structure is present in a side chain, the mass average molecular weight is more preferably 8,000 or more and 100,000 or less and still more preferably 10,000 or more and 50,000 or less.

In a case in which the functional group that reacts with a —OH group in the linear structure is present in a polymer terminal, the mass average molecular weight is more preferably 1,000 or more and 30,000 or less and still more preferably 3,000 or more and 10,000 or less.

The glass transition temperature of the polymer coating the surfaces is preferably −80° C. or higher and 50° C. or lower, and the moisture concentration is preferably 100 ppm or less.

Meanwhile, regarding the methods for measuring the mass average molecular weight, the glass transition temperature, and the moisture concentration, the description of the method for measuring the mass average molecular weight, the glass transition temperature, and the moisture concentration in the section of the binder described below is preferably applied.

In addition, the surface of at least one linear structure is also preferably coated with a low-molecular-weight compound having a different structure from that of the central portion of the linear structure.

Examples of the low-molecular-weight compound include saturated aliphatic acids (preferably having 1 to 30 carbon atoms and more preferably having 8 to 20 carbon atoms, lauric acid, stearic acid, and the like) and unsaturated aliphatic acids (preferably having 2 to 30 carbon atoms and more preferably having 8 to 20 carbon atoms, oleic acid, linolenic acid, or the like).

In a case in which covalent bonds are formed between the surfaces of the linear structures and the low-molecular-weight compound coating the surfaces, the low-molecular-weight compound needs to have one or more functional groups that react with a —OH group in the linear structure in the molecule.

Examples of the low-molecular-weight compound having a functional group that reacts with a —OH group in the linear structure include aliphatic acid chlorides (preferably having 1 to 30 carbon atoms, lauric acid chloride and the like) and unsaturated aliphatic acid chlorides (preferably having 2 to 30 carbon atoms, oleic acid chloride, linolenic acid chloride, and the like).

The molecular weight of the low-molecular-weight compound is preferably 50 to 1,000 and more preferably 100 to 500.

Examples of the linear structure made of the organic substance include cellulose nanofibers (trade name: CEL-ISH (manufactured by Daicel FineChem Ltd.)), substituted cellulose nanofibers, polyester nanofibers (trade name: NANOFRONT (manufactured by Teijin Limited)), polyamide nanofibers (trade name: TIARA (manufactured by Daicel FineChem Ltd.)), acrylic nanofibers, polyurethane nanofibers, and polyimide nanofibers.

Examples of the linear structure made of carbon include carbon nanotubes and carbon nanofibers.

Example of the linear structures made of an inorganic substance include linear structures made of metal (silver nanowires, copper nanowires, nickel nanowires, cobalt nanowires, gold nanowires, and the like), linear structures made of ceramic (aluminum oxide nanowires, copper hydroxide nanowires, hydroxyapatite nanowires, iron oxide hydrate nanowires, iron oxide nanowires, nickel hydroxide nanowires, magnesium oxide nanowires, molybdenum oxide nanowires, silicon carbide nanowires, titanium oxide nanowires, nickel oxide nanowires, tungsten oxide nanowires, vanadium oxide nanowires, zinc oxide nanowires, and the like), and linear structures made of glass (silica glass nanofibers and the like).

At least one linear structure preferably contains a cellulose nanofiber, and at least one linear structure is more preferably a substituted or unsubstituted cellulose nanofiber since the linear structure is stable with respect to the inorganic solid electrolyte and has a number of hydroxyl groups derived from cellulose, whereby it is possible to easily form covalent bonds on the surfaces of the linear structures.

Examples of the substituted cellulose nanofiber include, in addition to commercially available products, unsubstituted cellulose nanofibers having a surface coated with the above-described organic substance.

The linear structures that are used in the present invention are more preferably in a state of being dispersed in an organic solvent.

In the case of a water dispersion, it is possible to dehydrate the water dispersion by carrying out azeotropic dehydration using an organic solvent having a higher boiling point than water and transit the phase of the water dispersion to an organic solvent. Examples of the dehydration method include the above-described method in which azeotropic dehydration with organic solvents is carried out and dehydration methods using a dehydration agent such as silica get a molecular sieve, magnesium sulfate, or sodium sulfate.

In order to transit the phase of the water dispersion to an organic solvent, the water dispersion is preferably dehydrated in multiple steps. That is, in the dehydration in the first step, a water-soluble low-boiling point organic solvent is used, and in the dehydration in the second and later steps, organic solvents that are more lipophilic and have a higher boiling point than the organic solvents that are used in the previous steps are used. In the end, the phase of the water dispersion transit from a water phase to an oil phase (organic solvent). The organic solvent that is used for dehydration in the final step preferably has a higher boiling point than water. In addition, after almost all moisture is removed (so as to reach 10,000 ppm or less (1% or less) using a hydrophilic organic solvent in the dehydration in the first step, an operation for coating the linear structures with the organic substance is carried out, thereby hydrophilizing the surfaces of the linear structures. The water dispersion is further dehydrated using lipophilic organic solvents in the second and later steps, whereby agglomeration does not occur, and uniform dispersions can be obtained.

The water dispersion is preferably dehydrated using the above-described method since the linear structures do not agglomerate, and it is possible to produce organic solvent dispersions in which the dispersibility is maintained and the moisture content is in a preferred range described below. For example, in a case in which water is volatilized by drying the water dispersion of the linear structures, the linear structures agglomerate and cannot be re-dispersed, which is not preferable.

The moisture content of a linear structure dispersion that is used in the present invention is preferably 50 ppm or less, more preferably 40 ppm or less, and still more preferably 30 ppm or less. The lower limit value of the moisture content is not particularly limited, but is realistically 0.001 ppm or more.

Meanwhile, the moisture content of the linear structure dispersion can be measured with reference to the method for measuring the moisture content of the linear structure dispersion described in the section of examples.

The moisture content in the above-described preferred range enables the suppression of reactions with water in a case in which a sulfide-based inorganic solid electrolyte is used as the inorganic solid electrolyte.

The content ratio of the linear structures is preferably 0.1% to 20% by mass, more preferably 0.1% to 10% by mass, still more preferably 0.1% to 5% by mass, and particularly preferably 0.1% to 2% by mass of all solid components in the solid electrolyte composition.

Meanwhile, the solid components in the present specification refer to components that do not disappear through volatilization or evaporation when dried at 170° C. for six hours. Typically, the solid components refer to components other than organic solvents described below.

The content ratio of the linear structures is preferably in the above-described preferred range since it is possible to enhance the bonding property of solid interfaces without impairing the conductivity of ions.

One kind of the linear structures may be used singly or two or more kinds of the linear structures may be used in combination, but one kind of the linear structures are preferably used singly.

The linear structures may be mixed into the solid electrolyte composition in a single body form or in a form of an organic solvent dispersion of the linear structures. Among these, the linear structures are preferably mixed into the solid electrolyte composition in a form of an organic solvent dispersion of the linear structures.

The concentration (solid content concentration) of the linear structures in the organic solvent dispersion is preferably 0.01% to 5% by mass and more preferably 0.1% to 3% by mass from the viewpoint of maintaining the dispersibility of the linear structures.

(Inorganic Solid Electrolyte)

The inorganic solid electrolyte is an inorganic solid electrolyte, and the solid electrolyte refers to a solid-form electrolyte capable of migrating ions therein. The inorganic solid electrolyte is clearly differentiated from organic solid electrolytes (macromolecular electrolytes represented by PEO or the like and organic electrolyte salts represented by LiTFSI) since the inorganic solid electrolyte does not include any organic substances as a principal ion-conductive material. In addition, the inorganic solid electrolyte is a solid in a static state and is thus, generally, not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has ion conductivity of ions of metals belonging to Group I or II of the periodic table (hereinafter, also referred to as the ion conductivity of metal) and is generally a substance not having electron conductivity.

In the present invention, the inorganic solid electrolyte has ion conductivity of ions of metals belonging to Group I or II of the periodic table. As the inorganic solid electrolyte, it is possible to appropriately select and use solid electrolyte materials that are applied to this kind of products. Typical examples of the inorganic solid electrolyte include (i) sulfide-based inorganic solid electrolytes and (ii) oxide-based inorganic solid electrolytes.

(Sulfide-based Inorganic Solid Electrolytes)

Sulfide-based inorganic solid electrolytes are preferably inorganic solid electrolytes which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples thereof include lithium ion-conductive inorganic solid electrolytes satisfying a composition represented by Formula (1).

$$L_{a1}M_{b1}P_{c1}S_{d1}A_{e1} \qquad (1)$$

(In the formula, L represents an element selected from Li, Na, and K and is preferably Li. M represents an element selected from B, Zn, Sn, Si, Cu, Ga, Sb, Al, and Ge. Among these, B, Sn, Si, Al, and Ge are preferred, and Sn, Al, and Ge are more preferred. A represents I, Br, Cl, and F and is preferably I or Br and particularly preferably I. a1 to e1 represent the compositional ratios among the respective elements, and a1:b1:c1:d1:e1 satisfies 1 to 12:0 to 1:1:2 to 12:0 to 5. Furthermore, a1 is preferably 1 to 9 and more preferably 1.5 to 4. b1 is preferably 0 to 0.5. Furthermore, d1 is preferably 3 to 7 and more preferably 3.25 to 4.5. Furthermore, e1 is preferably 0 to 3 and more preferably 0 to 1.)

In Formula(1), the compositional ratios among L, M, P, S, and A are preferably b1=0 and e1=0, more preferably b1=0, e1=0, and the ratio among a1, c1, and d1 (a1:c1:d1)=1 to 9:1:3 to 7, and Mill more preferably b1=0, and e1=0, and a1:c1:d1=1.5 to 4:1:3.25 to 4.5. The compositional ratios among the respective elements can be controlled by adjusting the amounts of raw material compounds blended to manufacture the sulfide-based solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, R and S or Li—P—S-based glass ceramic containing Li, P, and S.

The sulfide-based inorganic solid electrolytes can be manufactured by a reaction of [1] lithium sulfide ($Li_2S$) and phosphorus sulfide (for example, diphosphorus pentasulfide ($P_2S_5$)), [2] lithium sulfide and at least one of a phosphorus single body and a sulfur single body, or [3] lithium sulfide, phosphorus sulfide (for example, diphosphorus pentasulfide ($P_2S_5$)), and at least one of a phosphorus single body and a sulfur single body.

The ratio between $Li_2S$ and $P_2S_5$ in Li—P—S-based glass and Li—P—S-based ceramic is preferably 65:35 to 85:15 and more preferably 68:32 to 77:23 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

Specific examples of the compound include compounds formed using a raw material composition containing, for example, $Li_2S$ and a sulfide of an element of Groups XIII to XV. Specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$LiI, $Li_2S$—$SiS_2$—$Li_4SiO_4$, $Li_2S$—$SiS_2$—$Li_3PO_4$, $Li_{10}GeP_2S_{12}$, and the like. Among these, crystalline and/or amorphous raw material compositions consisting of $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—

$Li_3PO_4$, $Li_2S$—$LiI$—$Li_2O$—$P_2P_2S_5$, $Li_2S$—$Li_2O$—$P_2S_5$, $Li_2S$—$Li_3PO_4$—$P_2S_5$, $Li_2S$—$GeS_2$—$P_2S_5$, and $Li_{10}GeP_2S_{12}$ are preferred due to their high lithium ion conductivity. Examples of a method for synthesizing sulfide-based inorganic solid electrolyte materials using the above-described raw material compositions include an amorphization method. Examples of the amorphization method include a mechanical milling method and a melting quenching method. Among these, the mechanical milling method is preferred. This is because treatments at normal temperature become possible, and it is possible to simplify manufacturing steps.

(ii) Oxide-based Inorganic Solid Electrolytes

Oxide-based inorganic solid electrolytes are preferably inorganic solid electrolytes which contain oxygen atoms (O), have an ion conductivity of metals belonging to Group I or II of the periodic table, and have electron-insulating properties.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In and Sn, xb satisfies 5≤xb≤10, yb satisfies 1≤yb≤4, zb satisfies 1≤zb≤4, mb satisfies 0≤mb≤2, and nb satisfies 5nb≤20.), $Li_{xc}B_{yc}M^{cc}{}_{xc}O_{nc}$ ($M^{cc}$ is at least one of C, S, Al, SI, Ga, Ge, In, and Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xc)}M^{cc}{}_{ac}D^{cc}O$ (xe represents a number of 0 or more and 0.1 less, and $M^{cc}$ represents a divalent metal atom. $D^{cc}$ represents a halogen atom or a combination of two or more halogen atoms.). $Li_xSi_yO_{zf}$ (1≤xf≤5, 0≤yf≤3, 1≤zf≤10), $Li_{xg}S_{yg}O_{zg}$ (1≤xg≤3, 0≤yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3-5}Zn_{0.25}GeO_4$ having a lithium superionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P and O are also desirable. Examples thereof include lithium phosphate ($Li_3PO_4$), LiPON in which some of oxygen atoms in lithium phosphate are substituted with nitrogen, $LiPOD^1$ ($D^1$ is at least one selected from Ti, V, Cr, Mn, Fe, Co, Ni, Cu, Zr, Nb, Mo, Ru, Ag, Ta, W, Pt, Au, and the like), and the like. It is also possible to preferably use $LiA^1ON$ ($A^1$ represents at least one selected from Si, B, Ge, Al, C, Ga, and the like) and the like.

In the present invention, the inorganic solid electrolyte having ion conductivity of metals belonging to Group I or II of the periodic table has a high ion conductivity and a small particle interface resistance and is thus preferably a sulfide-based inorganic solid electrolyte.

The volume-average particle diameter of the inorganic solid electrolyte is not particularly limited, but is preferably 0.01 μm or more and more preferably 0.1 μm or more. The upper limit is preferably 100 μm or less and more preferably 50 μm or less. Meanwhile, the average particle diameter of the inorganic solid electrolyte particles is measured in the following order. One percent by mass of a dispersion liquid is diluted and prepared using the inorganic solid electrolyte particles and water (heptane in a case in which the inorganic solid electrolyte is unstable in water) in a 20 ml sample bottle by means of dilution. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution, measurement instrument LA-920 (manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis—Dynamic light scattering method" is referred to as necessary. Five specimens are produced per level, and the average values thereof are employed.

When a decrease in interface resistance and the maintenance of the decreased interface resistance are taken into account, the concentration of the inorganic solid electrolyte in the solid component of the solid electrolyte composition is preferably 5% by mass or more, more preferably 10% by mass or more, and particularly preferably 20% by mass or more with respect to 100% by mass of the solid components. From the same viewpoint, the upper limit is preferably 99.9% by mass or less, more preferably 99.5% by mass or less, and particularly preferably 99% by mass or less.

These inorganic solid electrolytes may be used singly or two or more inorganic solid electrolytes may be used in combination.

(Binder)

The solid electrolyte composition of the present invention also preferably contains a binder. Binders that can be used in the present invention are not particularly limited as long as the binders are organic polymers.

The binder that can be used in the present invention is preferably a binder that is generally used as binding agents for positive electrodes or negative electrodes of battery materials, is not particularly limited, and is preferably, for example, a binder consisting of resins described below.

Examples of fluorine-containing resins include polytetrafluoroethylene (PFE), polyvinylene difluoride (PVdF), and copolymers of polyvinylene difluoride and hexafluoropropylene (PVdF-HFP).

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber, polybutadiene, polyisoprene, polyisoprene latex, and the like.

Examples of acrylic resins include polymethyl (meth)acrylate, polyethyl (meth)acrylate, polyisopropyl (meth)acrylate, polyisobutyl (meth)acrylate, polybutyl (meth)acrylate, polyhexyl (meth)acrylate, polyoctyl (meth)acrylate, polydodecyl (meth)acrylate, polystearyl (meth)acrylate, poly 2-hydroxyethyl (meth)acrylate, polyy(meth)acrylate, polybenzyl (meth)acrylate, polyglycidyl (meth)acrylate, polydimethylaminopropyl (meth)acrylate, and copolymers of monomers constituting the above-described resins.

Examples of urethane resins include polyurethane.

In addition, copolymers with other vinyl-based monomers are also preferably used. Examples thereof include polymethyl (meth)acrylate-polystyrene copolymers, polymethyl (meth)acrylate-acrylonitrile copolymers, polybutyl (meth)acrylate-acrylonitrile-styrene copolymers and the like.

These binders may be used singly or two or more binders may be used in combination.

The binder that can be used in the present invention is preferably polymer particles, and the average particle diameter ϕ of the polymer particles is preferably 0.1 μm to 100 μm, more preferably 0.05 μm to 50 μm, and still more preferably 0.05 μm to 20 μm. The average particle diameter ϕ is preferably in the preferred range described above from the viewpoint of improvement in output density.

The average particle diameter ϕ of the polymer particles that can be used in the present invention is not particularly limited and refers to an average particle diameter according to the following measurement conditions and definition.

One percent by mass of a dispersion liquid is prepared using the polymer particles and an arbitrary solvent (an organic solvent that is used to prepare the solid electrolyte composition, for example, heptane) in a 20 ml sample bottle by means of dilution. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., and the obtained volume-average particle diameter is considered as the average particle diameter ϕ. Regarding other detailed conditions and the like, the description of JIS Z8828:2013 "Particle size analysis-Dynamic light scattering method" is referred to as necessary. Five specimens are produced per level, and the average values thereof are employed.

Meanwhile, the average particle diameter ϕ can be measured from the produced all-solid state secondary battery by, for example, disassembling the battery, peeling the electrodes, measuring the average particle diameters of the electrode materials according to the above-described method for measuring the average particle diameter of the polymer particles, and subtracting the measurement value of the average particle diameter of particles other than the polymer particles which has been measured, in advance.

The structure of the polymer particles is not particularly limited as long as the polymer particles are organic polymer particles. Examples of resins constituting the organic polymer particles include the resins described as the resins constituting the binder, and the preferred resins are also applicable.

The shape of the polymer particles is not limited as long as the polymer particles maintain a solid form. The polymer particles may be mono-dispersed or poly-dispersed. The polymer particles may have a truly spherical shape or a flat shape and, furthermore, may have an irregular shape. The surfaces of the polymer particles may form a flat shape or an uneven shape. The polymer particles may have a core-shell structure, and the core (inner core) and the shell (outer shell) may be constituted of the same material or different materials. In addition, the polymer particles may be hollow particles, and the porosity is not limited.

The polymer particles can be synthesized using a method in which monomer particles are polymerized in the presence of a surfactant, an emulsifier, or a dispersant or a method in which the polymer particles are precipitated in a crystalline shape as the molecular weight increases.

In addition, an existing method in which polymers are mechanically crushed or a method in which a polymer solution is reprecipitated into a fine particle shape may also be used.

The polymer particles may be commercially available products or the oily latex-shape polymer particles described in JP2015-88486A and WO2015/046314A.

The average particle diameter ϕ of the polymer particles and the average length L of the linear structures also preferably satisfy a relationship represented by Expression (A).

$$L/1{,}000 \leq \phi < L$$ Expression (A)

Expression (A) is preferably $L/500 \leq \phi < L/2$ and more preferably $L/100 \leq \phi < L/10$.

In a case in which the relationship represented by Expression (A) is satisfied, the polymer particles and the linear structures are capable of forming a fine network-like structure, which is preferable.

In addition, the total mass $W_B$ of the linear structures and the total mass $W_D$ of the polymer particles also preferably satisfy a relationship represented by Expression (B).

$$W_B/10 < W_D < 20 \times W_B$$ Expression (b).

Expression (B) is preferably $W_B/5 < W_D < 10 \times W_B$ and more preferably $W_B/2 < W_D < 5 \times W_B$.

In a case in which the relationship represented by Expression (B) is satisfied, the polymer particles and the linear structures are capable of forming a fine network-like structure, which is preferable.

Furthermore, the linear structures and the polymer particles are preferably bonded to each other through covalent bonds since the thermal stability of the network-like structure formed by the polymer particles and the linear structures improves.

Examples of the covalent bonds include covalent bonds between the surfaces of the linear structures and the organic substance coating the surfaces.

Regarding the glass transition temperature of the binder, the upper limit is preferably 50° C. or lower, more preferably 0° C. or lower, and most preferably −20° C. or lower. The lower limit is preferably −100° C. or higher, more preferably −70° C. or higher, and most preferably −50° C. or higher.

The glass transition temperature (Tg) is measured using a dried specimen and a differential scanning calorimeter "X-DSC7000" (trade name, SII-NanoTechnology Inc.) under the following conditions. The glass transition temperature of the same specimen is measured twice, and the measurement result of the second measurement is employed.

Atmosphere of the measurement chamber: Nitrogen (50 mL/min)
Temperature-increase rate: 5° C.
Measurement-start temperature: −100° C.
Measurement-end temperature 200° C.
Specimen pan: Aluminum pan
Mass of the measurement specimen: 5 mg
Calculation of Tg: Tg is calculated by rounding off the middle temperature between the declination-start point and the declination-end point in the DSC chart to the integer.

The polymer (preferably the polymer particles) constituting the binder that can be used in the present invention preferably has a moisture concentration of 100 ppm or less (mass-based) and Tg of 100° C. or lower.

In addition, the polymer constituting the binder that can be used in the present invention may be dried by being crystallized or may be used in a polymer solution form. The amount of a metal-based catalyst (tin, titanium, or bismuth catalyst which is an urethanization or polyesterification catalyst) is preferably small. The concentration of metal in copolymers is preferably set to 100 ppm or less (mass-based) by decreasing the amount of the metal during polymerization or removing the catalyst by means of crystallization.

Meanwhile, the moisture concentration of the polymer can be measured with reference to the method for measuring the moisture content of a linear structure dispersion described in the section of examples.

The solvent that is used for the polymerization reaction of the polymer is not particularly limited. Meanwhile, solvents that do not react with the inorganic solid electrolyte or the active materials and furthermore do not decompose the inorganic solid electrolyte or the active materials are desirably used. For example, it is possible to use hydrocarbon-based solvents (toluene, heptane, and xylene), ester-based solvents (ethyl acetate and propylene glycol monomethyl ether acetate), ether-based solvents (tetrahydrofuran, dioxane and 1,2-diethoxyethane), ketone-based solvents (acetone, methyl ethyl ketone, and cyclohexanone), nitrile-based solvents (acetonitrile, propionitrile, butyronitrile, and isobutyronitrile), and halogen-based solvents (dichloromethane and chloroform).

The mass average molecular weight of the polymer constituting the binder that can be used in the present invention is preferably 10,000 or more, more preferably 20,000 or more, and still more preferably 50,000 or more. The upper limit is preferably 1,000,000 or less, more preferably 200,000 or less, and still more preferably 100,000 or less.

In the present invention, the molecular weight of the polymer refers to the mass average molecular weight unless particularly otherwise described. The mass average molecular weight can be measured as the polystyrene-equivalent molecular weight by means of GPC. At this time, the polystyrene-equivalent molecular weight is detected as RI using a GPC apparatus HLC-8220 (manufactured by Tosoh Corporation) and G3000HXL+G2000HXL as columns at a flow rate at 23° C. of 1 mL/min. An eluent can be selected from tetrahydrofuran (THF), chloroform, N-methyl-2-pyrrolidone (NMP), and m-cresol/chloroform (manufactured by Shonanwako Junyaku KK), and THF is used in a case in which the polymer needs to be dissolved.

In a case in which favorable interface resistance-reducing and maintaining properties are taken into account when the binder is used in all-solid state secondary batteries, the concentration of the binder in the solid electrolyte composition is preferably 0.01% by mass or more, more preferably 0.1% by mass or more, and still more preferably 1% by mass or more with respect to 100% by mass of the solid components. From the viewpoint of battery characteristics, the upper limit is preferably 10% by mass or less, more preferably 5% by mass or less, and still more preferably 3.5% by mass or less.

In the present invention, the mass ratio [(the mass of the inorganic solid electrolyte and the mass of the electrode active material)/the mass of the binder] of the total mass of the inorganic solid electrolyte and the electrode active materials that are added as necessary to the mass of the binder is preferably in a range of 1,000 to 1. This ratio is more preferably 500 to 2 and still more preferably 100 to 10.

(Dispersant)

The solid electrolyte composition of the present invention also preferably contains a dispersant. The addition of a dispersant suppresses the agglomeration of the electrode active materials or the inorganic solid electrolyte even in a case in which the concentration of any one of the electrode active materials or the inorganic solid electrolyte is high and enables the formation of uniform electrode layers and the solid electrolyte layer. The addition of a dispersant is also effective for improvement in output density.

The dispersant is made of a low-molecular-weight molecule or oligomer having a molecular weight of 200 or more and less than 3,000 and contains a functional group represented by a group of functional groups (I), an alkyl group having 8 or more carbon atoms, and an aryl group having 10 or more carbon atoms in the same molecule.

Group of functional groups (I): acidic groups, groups having a basic nitrogen atom, (meth)acrylic groups, (meth) acrylamide groups, alkoxysilyl groups, epoxy groups, oxetanyl groups, isocyanate groups, cyano groups, thiol groups, and hydroxy groups The molecular weight of the dispersant is preferably 300 or more and less than 2,000 and more preferably 500 or more and less than 1,000. In a case in which the molecular weight is the above-described upper limit value or less, particles do not easily agglomerate together, and it is possible to effectively suppress a decrease in output. In addition, in a case in which the molecular weight is the above-described lower limit value or more, the dispersant does not easily volatilize in a stage in which a solid electrolyte composition slurry is applied and dried.

The content of the dispersant is preferably 0.01% to 10% by mass, more preferably 0.1% to 5% by mass, and still more preferably 1% to 3% by mass of the total solid components of each of the layers.

(Lithium Salt)

The solid electrolyte composition of the present invention also preferably contains a lithium salt.

The lithium salt is preferably a lithium salt that is ordinarily used in this kind of products and is not particularly limited, and, the lithium salts described in paragraphs 0082 to 0085 of JP2015-088486A are preferred.

The content of the lithium salt is preferably 0 parts by mass or more and more preferably 5 parts by mass or more with respect to 100 parts by mass of the solid electrolyte. The upper limit is preferably 50 parts by mass or less and more preferably 20 parts by mass or less.

(Auxiliary Conductive Agent)

The solid electrolyte composition, of the present invention also preferably contains an auxiliary conductive agent. As the auxiliary conductive agent, auxiliary conductive agents that are known as ordinary auxiliary conductive agents can be used. The auxiliary conductive agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene and also may be metal powder or a metal fiber of copper, nickel, or the like, and a conductive macromolecule such as polyaniline, polypyrrole, polythiophene, polyacetylene, or a polyphenylene derivative may also be used. In addition, these auxiliary conductive agents may be used singly or two or more auxiliary conductive agents may be used.

(Positive Electrode Active Material)

Next a positive electrode active material that is used in the solid electrolyte composition for forming the positive electrode active material layer in the all-solid state secondary battery of the present invention (hereinafter, also referred to as the composition for a positive electrode) will be described. The positive electrode active material is preferably a positive electrode active material capable of reversibly intercalating and deintercalating lithium ions. The above-described material is not particularly limited and may be transition metal oxides, elements capable of being complexed with Li such as sulfur, or the like. Among these, transition metal oxides are preferably used, and the transition metal oxides more preferably have one or more demerits selected from Co, Ni, Fe, Mn, Cu, and V as transition metal.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

The volume-average particle diameter (circle-equivalent average particle diameter) of the positive electrode active material that is used in the all-solid state secondary battery of the present invention is not particularly limited. Meanwhile, the volume-average particle diameter is preferably 0.1 μm to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The concentration of the positive electrode active material is not particularly limited, but is preferably 10% to 90% by mass and more preferably 20% to 80% by mass with respect to 100% by mass of the solid components in the composition for a positive electrode.

The positive electrode active material may be used singly or two or more positive electrode active materials may be used in combination.

(Negative Electrode Active Material)

Next, a negative electrode active material that is used in the solid electrolyte composition for forming the negative electrode active material layer in the ail-solid state secondary battery of the present invention (hereinafter, also referred to as the composition for a negative electrode) will be described. The negative electrode active material is preferably a negative electrode active material capable of reversibly intercalating and deintercalating lithium ions. The above-described material is not particularly limited, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn, Si, and In and the like. Among these, carbonaceous materials or metal complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), natural graphite, artificial graphite such as highly oriented pyrolytic graphite, and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2 θ value in a range of 20° to 40° in an X-ray diffraction method in which CuKα rays are used and may have crystalline diffraction lines. The highest intensity in the crystalline diffraction line appearing at the 2θ value of 40° or more and 70° or less is preferably 100 times or less and more preferably five times or less of the diffraction line intensity at the peak of the broad scattering line appearing at the 2θ value of 20° or more and 40° or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ba, Si, Sn, Ge, Pb, Sb, and Bi, and chalcogenides are particularly preferred. Specific examples of preferred amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, these amorphous oxides may be complex oxides with lithium oxide, for example, $Li_2SnO_2$.

The average particle diameter of the negative electrode active material is preferably 0.1 μm to 60 μm. In order to provide a predetermined particle diameter, a well-known crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which wafer or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The negative electrode active material also preferably contains titanium atoms. More specifically, $Li_4Ti_5O_{12}$ is preferred since the volume fluctuation during the absorption and emission of lithium ions is small and thus the high-speed charging and discharging characteristics are excellent and the deterioration of electrodes is suppressed, whereby it becomes possible to improve the service lives of lithium ion secondary batteries.

The concentration of the negative electrode active material is not particularly limited, but is preferably 10 to 80% by mass and more preferably 20 to 70% by mass with respect to 100% by mass of the solid components in the composition for a negative electrode.

The negative electrode active material may be used singly or two or more negative electrode active materials may be used in combination.

(Organic Solvents)

The solid electrolyte composition of the present invention contains organic solvents. The organic solvents need to be capable of dispersing the respective components described above, and specific examples thereof include the following media.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripopylene glycol monomethyl ether, diethylene glycol monobutyl ether, and the like), dimethyl ether, diethyl ether, diisopropyl ether, dibutyl ether, cyclohexyl methyl ether, t-butyl methyl ether, tetrahydrofuran, and dioxane.

Examples of amide compound solvents include N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropaamide, and hexamethylphosphoric triamide.

Examples of amino compound solvents include triethylamine, diisopropylethylamine, and tributylamine.

Examples of ketone compound solvents include acetone, methyl ethyl ketone, methyl isobutyl ketone, cyclohexanone, and diisobutyl ketone.

Examples of aromatic compound solvents include benzene, toluene, and xylene.

Examples of ester compound solvents include ethyl acetate, propyl acetate, butyl acetate, ethyl formate, propyl formate, butyl formate, ethyl lactate, propylene glycol monomethyl ether acetate, methyl isobutyrate, isopropyl isobutyrate, methyl pivalate, and isopropyl cycloshexanecarboxylate.

Examples of aliphatic compound solvents include pentane, hexane, heptane, octane, decane, and cyclohexane.

Examples of nitrile compound solvents include acetonitrile, propionitrile, and butyronitrile.

The boiling points of the organic solvents at normal pressure (one atmosphere) are preferably 50° C. or higher and more preferably 70° C. or higher. The upper limit is preferably 250° C. or lower and more preferably 220° C. or lower.

In a case in which the linear structures that are used in the present invention are a water dispersion, as described in the section of the linear structures, azeotropic dehydration is preferably carried out using an organic solvent having a higher boiling point than water as the organic solvent used to transit the phase of the linear structure water dispersion to the organic solvent. Therefore, as the organic solvents that are used for azeotropic dehydration, at least one organic solvent that is used in the present invention preferably has a boiling point of 100° C. or higher and more preferably has a boiling point of 120° C. or higher. The upper limit is preferably 250° C. or lower and more preferably 220° C. or lower.

Furthermore, the organic solvent having a higher boiling point than water preferably has a ClogP value of 3.0 or less since the linear structures do not agglomerate and it becomes possible to transit the phase of the water dispersion to organic solvents. The lower limit of the ClogP value is not particularly limited, but is realistically −0.3 or more.

Examples of organic solvents having a higher boing point than water and a ClogP value of 3.0 or less include dibutyl ether (2.9), diisobutyl ketone (2.7), dicylopentyl ether (2.8), and diglyme (−0.18). Meanwhile, numerical values in parentheses indicate ClogP values.

The octanol-water partition coefficient (logP value) can be generally measured using the shake flask method described in Japanese Industrial Standards (JIS) Z7260-107 (2000). In addition, the octanol-water partition coefficient (logP value) can also be estimated using a computational chemical method or an experiential method instead of actual measurement. As the computational method, Crippen's fragmentation method (J. Chem. Inf. Comput. Sci., 27, 21 (1987), Viswanadhan's fragmentation method (J. Chem. Inf. Comput. Sci., 29, 163 (1989)), Broto's fragmentation method (Eur. J. Med. Chem.-Chim. Theor., 19, 71 (1984)), and the like are known. In the present invention, Crippen's fragmentation method (J. Chem. Inf. Comput. Sci., 27, 21 (1987)) is used.

The ClogP value is a value of the common logarithm logP of the partition coefficient P of 1-octanol and water obtained by calculation. Regarding methods or software used for the calculation of the ClogP value, well-known methods or software can be used, there is no particular limitation, and, in the present invention, a ClogP program combined into the system by Daylight Chemical Information Systems, Inc.: PCModel is used.

In the present invention, the organic solvents are preferably at least one kind of organic solvents selected from the group consisting of hydrocarbon-based solvents, ether compound solvents, ketone compound solvents, ester compound solvents, and nitrile compound solvents, and the number of carbon atoms is more preferably four or more in all of the organic solvents. Examples of the hydrocarbon-based solvents include the aromatic compound solvents and the aliphatic compound solvents described above.

The number of carbon atoms in the organic solvents is still more preferably 6 or more, and the upper limit of the number of carbon atoms is preferably 20 or less and more preferably 10 or less.

In a case in which the organic solvents in the above-described preferred range are used, the deterioration of solid electrolytes is prevented, and compositions in which the linear structures are dispersed can be obtained.

One kind of the organic solvents may be used singly or two or more kinds of the organic solvents may be used in combination.

To the solid electrolyte composition of the present invention, an organic solvent that is used for the linear structure dispersion (for example, the above-described organic solvent having a higher boiling point than water) and an organic solvent that is used to disperse the inorganic solid electrolyte, the active materials, and the like can be added. These organic solvents may be identical to each other or different from each other as long as the organic solvents are compatible with each other.

The organic solvent that is used for the linear structure dispersion is preferably an ether compound solvent or a ketone compound solvent, and the organic solvent that is used to disperse the inorganic solid electrolyte, the active materials, and the like is preferably at least one organic solvent selected from the group consisting of ether compound solvents, ketone compound solvents, and hydrocarbon-based solvents.

In a case in which the solid electrolyte composition contains a hydrocarbon-based solvent and polar solvent as the organic solvents, the ratio between the hydrocarbon-based solvent and the polar solvent is preferably 90/10 to 10/90 in terms of the mass ratio of the hydrocarbon-based solvent/the polar solvent.

In a case in which the ratio is in the above-described preferred range, the linear structures do not agglomerate and remain in a dispersed state in the solid electrolyte composition. In addition, the inorganic solid electrolyte can be present without being eluted or deteriorated.

Meanwhile, examples of the polar solvent include the alcohol compound solvents, the ether compound solvents, the amide compound solvents, the amino compound solvents, the ketone compound solvents, the ester compound solvents, and the nitrite compound solvents described above.

(Moisture Content of Solid Electrolyte Composition)

The moisture content of the solid electrolyte composition of the present invention, that is, the moisture content as the solid electrolyte composition the organic solvents is preferably 50 ppm or less, more preferably 40 ppm or less, and still more preferably 30 ppm or less. The lower limit value of the moisture content is not particularly limited, but is realistically 0.001 ppm or more.

Meanwhile, the moisture content of the solid electrolyte composition can be measured using the same method as for the moisture content of the above-described linear structure dispersion.

The moisture content in the above-described preferred range enables the suppression of reactions between a sulfide-based inorganic solid electrolyte and water in a case in which the sulfide-based inorganic solid electrolyte is used as the inorganic solid electrolyte.

The content of the organic solvent is preferably 20 to 80 parts by mass, more preferably 30 to 80 parts by mass, and still more preferably 40 to 75 parts by mass in 100 parts by mass of the total mass of the solid electrolyte composition.

<Collector (Metal Foil)>

The collectors of positive and negative electrodes are preferably electron conductors. The collector of the positive electrode is preferably a collector obtained by treating the surface of an aluminum or stainless steel collector with carbon, nickel, titanium, or silver in addition to an aluminum collector, a stainless steel collector, a nickel collector, a titanium collector, or the like, and, among these, an aluminum collector and an aluminum alloy collector are more preferred. The collector of the negative electrode is preferably an aluminum collector, a copper collector, a stainless steel collector, a nickel collector, or a titanium collector and more preferably an aluminum collector a copper collector, or a copper alloy collector.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 μm to 500 μm. In addition, the surface of the collector is preferably provided with protrusions and recesses by means of a surface treatment.

<Production of All-Solid State Secondary Battery>

The all-solid, state secondary battery may be produced using an ordinary method. Specific examples thereof include a method in which the solid electrolyte composition of the present invention is applied onto a metal foil which serves as the collector, thereby producing an electrode sheet for an all-solid state secondary battery on which a coated film is formed.

In the all-solid state secondary battery of the present invention, the electrode layers contain active materials. From the viewpoint of improving ion conductivity, the electrode layers preferably contain the inorganic solid electrolyte. In addition, from the viewpoint of improving the bonding properties between solid particles, between the electrodes, and between the electrode and the collector, the electrode layers preferably contain a linear structure and also preferably contain the binder.

The solid electrolyte layer contains the linear structure and the inorganic solid electrolyte. From the viewpoint of improving the bonding properties between solid particles and between layers, the solid electrolyte layer also preferably contains the binder.

For example, a composition which serves as a material for positive electrode is applied onto a metal foil which is a positive electrode collector so as to form a positive electrode active material layer, thereby producing a positive electrode sheet for a battery. The solid electrolyte composition of the present invention is applied onto the positive electrode active material layer, thereby forming a solid electrolyte layer. Furthermore, a composition which serves as a material for negative electrode is applied onto the solid electrolyte layer, thereby forming a negative electrode active material layer. A collector for the negative electrode (metal foil) is overlaid on the negative electrode active material layer, whereby it is possible to obtain a structure of an all-solid state secondary battery in which the solid electrolyte layer is sandwiched between a positive electrode layer and a negative electrode layer.

Meanwhile, the respective compositions described above may be applied using an ordinary method. At this time, the composition for forming the positive electrode active material layer, the composition for forming the inorganic solid electrolyte layer, and the composition for forming the negative electrode active material layer may be dried after being applied respectively or may be dried after being applied to multiple layers.

The drying temperature is not particularly limited. Meanwhile, the lower limit is preferably 30° C. or higher and more preferably 60° C. or higher, and the upper limit is preferably 200° C. or lower and more preferably 250° C. or lower. In a case in which the compositions are heated in the above-described temperature range, it is possible to remove the organic solvent and form a solid state.

[Usages of All-Solid State Secondary Battery]

The all-solid state secondary battery of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs mini discs, electric shavers, transceivers, electronic notebooks, calculators, portable tape recorders, radios, backup power supplies, memory cards, and the like. Additionally, examples of consumer usages include automobiles, electric vehicles, motors, lighting equipment, toys, games devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high safety, which is essential, and furthermore, the battery performance. In addition, in electric vehicles mounting high-capacity secondary batteries and domestic usages in which batteries are charged out every day, better safety is required against overcharging. According to the present invention, it is possible to preferably cope with the above-described use aspects and exhibit excellent effects.

According to the preferred embodiment of the present invention, individual application forms as described below are derived.

[1] Solid electrolyte compositions containing electrode active materials (compositions for an electrode that is a positive electrode or negative electrode).

[2] Electrode sheets for an all-solid state secondary battery having a positive electrode active material layer, a solid electrolyte layer, and a negative electrode active material layer in this order, in which at least one layer of the positive electrode active material layer, the solid electrolyte layer, or the negative electrode active material layer contains an inorganic solid electrolyte having ion conductivity of metals belonging to Group I or II of the periodic table and linear structures having an average diameter of 0.001 to 1 µm, an average length of 0.1 to 150 µm, a ratio of the average length to the average diameter of 10 to 100,000, and an electric conductivity of $1\times10^{-6}$ S/m or less.

[3] Electrode sheets for an all-solid state secondary battery having a positive electrode active material layer, a solid electrolyte layer, and a negative electrode active material layer in this order, in which all layers of the positive electrode active material layer, the solid electrolyte layer, and the negative electrode active material layer contain an inorganic solid electrolyte having ion conductivity of metals belonging to Group I or II of the periodic table and linear structures having an average diameter of 0.001 to 1 µm, an average length of 0.1 to 150 µm, a ratio of the average length to the average diameter of 10 to 100,000, and an electric conductivity of $1\times10^{-6}$ S/m or less.

[4] All-solid state secondary batteries constituted using the above-described electrode sheet for an all-solid state-secondary battery.

[5] Methods for manufacturing an electrode sheet for an all-solid state secondary battery in which the solid electrolyte composition is applied onto a metal foil, thereby forming a film.

[6] Methods for manufacturing an electrode sheet for an all-solid state secondary battery in which a wet slurry of the solid electrolyte composition is applied.

[7] Methods for manufacturing an all-solid state secondary battery in which all-solid state secondary batteries are manufactured using the method for manufacturing an all-solid state secondary battery.

Meanwhile, examples of the methods in which the solid electrolyte composition is applied onto a metal foil include coating (wet-type coating, spray coating, spin coating, slit coating, stripe coating, bar coating or dip coating), and wet-type coating is preferred.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (high-molecular-weight) all-solid state secondary batteries in which a high-molecular-weight compound such as polyethylene oxide is used as an electrolyte and inorganic all-solid state secondary batteries in which the Li—P—S-based glass, LLT, LLZ, or the like is used. Meanwhile, the application of high-molecular-weight compounds to inorganic all-solid state secondary batteries is not inhibited, and high-molecular-weight compounds can also be applied as binders of positive electrode active materials, negative electrode active materials, and inorganic solid electrolytes.

Inorganic solid electrolytes are differentiated from electrolytes in which the above-described high-molecular-weight compound is used as an ion conductive medium (high-molecular-weight-electrolyte), and inorganic compounds serve as ion conductive media. Specific examples thereof include the Li—P—S glass, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include LiTFSI.

In the present invention, "compositions" refer to mixtures obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. In the following examples, "parts" and "%" are mass-based unless particularly otherwise described. In addition, "-" used in the tables indicates that the corresponding components are not included in compositions of examples.

<Synthesis of Polymer Coating Surfaces of Linear Structures>

Synthesis Example 1

Synthesis of Acrylic Polymer (b-1) Coating Linear Structures

Propylene glycol monomethyl ether acetate (30 mL) was added to a 200 mL three-neck flask and heated to 80° C. in a nitrogen atmosphere. Benzyl methacrylate prepared in advance (manufactured by Wako Pure Chemical Industries, Ltd.) (10.0 g), acrylonitrile (manufactured by Wako Pure Chemical Industries, Ltd.) (5.4 g), KAREN MOIL (trade name, manufactured by Showa Denko K.K.) (2.1 g), and a propylene glycol monomethyl ether acetate solution (100 mL) of a radical polymerization initiator V-601 (trade name, manufactured by Wako Pure Chemical Industries, Ltd.) (0.25 g) were added dropwise thereto for two hours. After the end of the dropwise addition, the components were continuously heated and stirred at 80° C. for six hours and were then reprecipitated using hexane. Therefore, an acrylic polymer (b-1) having an isocyanate group in a side chain (15.2 g) was obtained. The mass average molecular weight was 23,200.

Synthesis Example 2

Synthesis of Acrylic Polymer (b-2) Coating Linear Structures

Dimethoxymethane (20 mL) was added to a 200 mL three-neck flask and heated to 70° C. in a nitrogen atmosphere. Methyl methacrylate prepared in advance (manufactured by Wako Pure Chemical Industries, Ltd.) (7.6 g), styrene (manufactured by Wako Pure Chemical Industries, Ltd.) (3.9 g), 3-(trimethoxysilyl)propyl methacrylate (manufactured by Tokyo Chemical Industry Co., Ltd.) (1.1 g), and a dimethoxyethane solution (100 mL) of a radical polymerization initiator V-60 (trade name, manufactured by Wako Pure Chemical Industries, Ltd.) (0.22 g) were added dropwise thereto for two hours. After the end of the dropwise addition, the components were continuously heated and stirred at 70° C. for six hours and were then reprecipitated using hexane. Therefore, an acrylic polymer (b-2) having an alkoxysilyl group in a side chain (0.9 g) was obtained. The mass average molecular weight was 19,760.

Synthesis Example 3

Synthesis of Acrylic Polymer (b-3) Coating Linear Structures

N-methyl pyrrolidine (120 mL), 1,4-butanediol (manufactured by Wako Pure Chemical Industries, Ltd.) (3.1 g), polyethylene glycol 600 (trade name, manufactured by Wako Pure Chemical Industries, Ltd., mass average molecular weight: 600) (12.9 g), and dicyclohexylmethane diisocyanate (manufactured by Tokyo Chemical Industry Co., Ltd.) (22.1 g) were added to a 200 mL three-neck flask and were heated and stirred at 80° C. NEOSTANN U-600 (trade name, manufactured by Nitto Kasei Co., Ltd.) (0.12 g) was collectively added thereto as a condensing agent, thereby initiating a polycondensation reaction. The components were continuously heated and stirred at 80° C. for eight hours and were then reprecipitated using acetonitrile. Therefore, a urethane polymer (b-3) having an isocyanate group is a polymer terminal (24.1 g) was obtained. The mass average molecular weight was 6,790.

<Transition of Phase of Cellulose Nanofiber Water Dispersion to Organic Solvent>

Synthesis Example 4

Preparation of Dibutyl Ether Dispersion (B-1) of Cellulose Nanofibers

A cellulose nanofiber water dispersion (trade name "CELISH KY100G", manufactured by Daicel FineChem Ltd., solid content concentration of 10%) (10.0 g) was weighed in a 500 mL eggplant flask and was diluted with pure water (30 mL). Tetrahydrofuran (200 g) was added thereto so as to produce a uniform dispersion, and then the dispersion was further depressurized and condensed at 200 mmHg 40° C. Dibutyl ether (300 g) was added thereto when the amount of the residue reached approximately 50 g and was further depressurized and condensed at 50 mmHg and 60° C. The components were depressurized and condensed until the amount of the residue reached approximately 50 g, and then dibutyl ether was added thereto so that the amount of the contents reached 200 g. A dried molecular sieve 3A (5 g) was added thereto, thereby obtaining a dibutyl ether dispersion (B-1) of cellulose nanofibers (200 g, solid content concentration: 0.5%, amount of moisture: 32 ppm). The cellulose nanofibers in the obtained dibutyl ether dispersion (B-1) had an average diameter D of 0.25 μm, and average length L of 25 μm, and an aspect ratio L/D of 100.

Synthesis Example 5

Preparation of Dibutyl Ether Dispersion (B-2) of Cellulose Nanofibers

A cellulose nanofiber water dispersion (trade name "CELISH KY110N", manufactured by Daicel FineChm Ltd., solid content concentration of 15%) (6.7 g) was weighed in a 500 ml, eggplant flask and was diluted with pure water (30 mL). Tetrahydrofuran (200 g) was added thereto so as to produce a uniform dispersion, and then the dispersion was further depressurized and condensed at 200 mmHg and 40° C. Dibutyl ether (300 g) was added thereto when the amount of the residue reached approximately 50 g and was further depressurized and condensed at 50 mmHg and 60° C. The components were depressurized and condensed until the amount of the residue reached approximately 50 g, and then dibutyl ether was added thereto so that the amount of the contents reached 200 g. A dried molecular sieve 3A (5 g) was added thereto thereby obtaining a dibutyl ether dispersion (B-2) of cellulose nanofibers (200 g, solid content concentration: 0.5%, amount of moisture; 30 ppm). The cellulose nanofibers in the obtained dibutyl ether dispersion (B-2) had an average diameter D of 0.20 μm, an average length L of 100 μm, and an aspect ratio L/D of 500.

<Synthesis of Nanofibers or Nanowires having Coated Surface>

Synthesis Example 6

Synthesis of Substituted Cellulose Nanofibers from Unsubstituted Cellulose Nanofibers The dibutyl ether dispersion (B-1) of cellulose nanofibers synthesized above (10 g) was weighed in a 100 mL sample bottle. Lauric acid chloride (0.23 g) was added thereto, and ultrasonic irradiation was carried out for one hour in a water bath, thereby obtaining a dibutyl ether dispersion (B-3) of cellulose nanofibers having a lauric-acid-esterified surface. The surface coating ratio was 18% by mass.

Synthesis Example 7

Coating of Surfaces of Cellulose Nanofibers with Polymer

The dibutyl ether dispersion (B-1) of cellulose nanofibers synthesized above (10 g) was weighed in a 100 mL sample bottle and was diluted with dibutyl ether (30 g). The acrylic polymer (b-1) synthesized above (0.15 g) was added thereto, stirred so as to be dissolved, then, sealed, and agitated in an oil bath at 80° C. for five hours. Therefore, a dibutyl ether dispersion (B-4) of cellulose nanofibers having a surface coated with the acrylic polymer (b-1) was obtained. The surface coating ratio was 27% by mass.

Synthesis Examples 8 to 12

Organic solvent dispersions (B-5) to (B-9) of linear structures shown in Table 1 (the solid contents were all 0.5%, and the surface coating ratios were sequentially 23%, 12%, 7%, 13%, and 9% by mass respectively) were prepared in the same manner as in Synthesis Example 7 except for the fact that the central portions and the surfaces of the linear structures were changed to the kinds shown in Table 1.

(Aspect Ratio, Average Diameter, and Average Length of Linear Structures)

The number-average diameters and number average lengths of the linear structures were obtained by means of SEM analyses.

In detail the organic solvent dispersion of the linear structures prepared above was cast onto an aluminum substrate and was observed with SEM, the values of the diameters and lengths of 20 or more fibers (which were the linear structures) per obtained image were read, the above-described process was carried out on at least three non-overlapped regions, and the information of the diameters and lengths of a minimum of 60 fibers was obtained.

Meanwhile, the "diameter of the fiber" refers to the largest diameter among the diameters of the fiber on a horizontal cross-section. That is, there are cases in which the diameters on a horizontal cross-section vary depending on the location of the horizontal cross-section, and, in this case, diameters are measured in individual horizontal cross-sections, and the diameter on the horizontal cross-section from which the largest diameter is obtained is considered as the "diameter of the fiber". In addition, in a case in which the horizontal cross-section of the fiber is not circular, the length of a longest straight line connecting two points present on the outer circumference of the horizontal cross-section is considered as the diameter on the horizontal cross-section.

From the obtained data of fiber diameters and lengths, the number-average diameter (for example, in a case in which the diameters of 60 fibers were measured, the number-average diameter was obtained by dividing the total of the diameters of the 60 fibers by 60) and the number-average length (in a case in which the lengths of 60 fibers were measured, the number-average length was obtained by dividing the total of the lengths of the 60 fibers by 60), and the aspect ratio was computed from the ratio between the number-average length and the number-average fiber diameter.

In Table 1, the number-average diameter, the number-average length, and the aspect ratio of the number-average length to the number-average diameter are abbreviated as "D", "L", and "D/L".

(Electric Conductivity of Linear Structures)

The organic solvent dispersion of the linear structures prepared above was cast onto a polyphenylene sulfone sheet film. The organic solvent dispersion was dried and applied repeatedly five times and peeled off from the polyphenylene sulfone sheet, thereby obtaining an independent film made of the linear structures. The surface resistivity R ($\Omega$/sq.) of the independent film was measured using a surface resistance meter (trade name "HIRSUTE XU MCP-HT800" manufactured by Mitsubishi Chemical Analytech Co., Ltd.).

Meanwhile, the film thickness d ($\mu$m) of the independent film made of the linear structures was measured using a micrometer.

The electric conductivity (S/m) was computed from the following expression using the obtained resistance value R and the film thickness d.

$$\text{Electric conductivity} = (1/R)/(d \times 10^{-6})$$

(Surface Coating Ratio of Linear Structures)

First a linear structure dispersion to be surface-coated (1 g) was weighed and dried in a vacuum at 100° C. for six hours, thereby measuring the solid content concentration X (%) in the linear structure dispersion to be surface-coated. Next, a dispersion of coated linear structures on which a coating treatment had been carried out (1) was sampled, and a supernatant solution in which non-coated organic substances were dissolved was removed by means of centrifugal separation. The residue obtained by means of the centrifugal separation was dried at 100° C. in a vacuum for six hours, thereby measuring the solid content concentration Y (%) in the dispersion of the coated linear structures on which a coating treatment had been carried out. The surface coating ratio (%) was computed from the following expression.

$$\text{Surface coating ratio} = (Y-X)/X \times 100$$

(Moisture Content of Linear Structure Dispersion)

The moisture content of the organic solvent dispersion of the linear structures prepared above was measured using the Karl Fischer's method. As a measurement instrument, a moisture meter CA-200 (trade name, manufactured by Mitsubishi Chemical Analytech Co., Ltd.) was used, and as a Karl Fischer solution, AQUAMICRON AX (trade name, manufactured by Mitsubishi Chemical Corporation) was used.

Meanwhile, in Table 1, the moisture content of the organic solvent dispersion of the linear structures is abbreviated as the moisture content.

TABLE 1

| Linear structure dispersion No. | Linear structure | | | | | | | |
|---|---|---|---|---|---|---|---|---|
| | Central portion | Surface | D ($\mu$m) | L ($\mu$m) | L/D | Electric conductivity (S/m) | Organic solvent Kind | Moisture content (ppm) |
| B-1 | KY100G | — | 0.25 | 25 | 100 | $1 \times 10^{-12}$ or less | Dibutyl ether | 32 |
| B-2 | KY110N | — | 0.20 | 100 | 500 | $1 \times 10^{-12}$ or less | Dibutyl ether | 30 |

TABLE 1-continued

| Linear structure dispersion No. | Linear structure Central portion | Surface | D (μm) | L (μm) | L/D | Electric conductivity (S/m) | Organic solvent Kind | Moisture content (ppm) |
|---|---|---|---|---|---|---|---|---|
| B-3 | KY100G | Lauric acid | 0.25 | 25 | 100 | $1 \times 10^{-12}$ or less | Dibutyl ether | 25 |
| B-4 | KY100G | b-1 | 0.30 | 25 | 83 | $1 \times 10^{-12}$ or less | Dibutyl ether | 25 |
| B-5 | KY100N | b-2 | 0.30 | 110 | 367 | $1 \times 10^{-12}$ or less | Dibutyl ether | 25 |
| B-6 | KY100N | b-3 | 0.30 | 120 | 400 | $1 \times 10^{-12}$ or less | Dibutyl ether | 20 |
| B-7 | 719781 | b-3 | 0.14 | 50 | 357 | $2 \times 10^{-7}$ | Diisobutyl ketone | 10 |
| B-8 | 773999 | b-3 | 0.09 | 1 | 11 | $5 \times 10^{-8}$ | Diisobutyl ketone | 10 |
| B-9 | 774529 | b-3 | 0.01 | 10 | 1,000 | $4 \times 10^{-9}$ | Diisobutyl ketone | 10 |

<Notes of table>
KY100G: Unsubstituted cellulose nanofiber (manufactured by Daicel FineChem Ltd., solid content of trade name "CELISH KY100G")
KY100N: Unsubstituted cellulose nanofiber (manufactured by Daicel FineChem Ltd., solid content of trade name "CELISH KY100N")
719781: Carbon nanofiber (manufactured by Aldrich-Sigma, Co, LLC., trade name "719781")
773999: Zinc oxide nanowire (manufactured by Aldrich-Sigma, Co, LLC., trade name "773999")
774529: Titanium oxide nanowire (manufactured by Aldrich-Sigma, Co. LLC., trade name "774529")
b-1 to b-3: Polymers synthesized above <Synthesis of Sulfide-based Inorganic Solid Electrolyte>
—Synthesis of Li—P—S-based Glass—

As a sulfide-based inorganic solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, s. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Aldrich-Sigma, Co, LLC. Purity: >99.98%) (3.90 g) were respectively weighed, injected into an agate mortar, and mixed using an agate muddler for five minutes. Meanwhile, the mixing ratio between $Li_2S$ and $P_2S_5$ was set to 75.25 in terms of molar ratio.

66 zirconia beads having a diameter of 5 mm were injected info a 45 mL zirconia container (manufactured by Fritsch Japan Co., Ltd.), the full amount of the mixture of the lithium sulfide and the diphosphorus pentasulfide was injected, thereinto, and the container was completely sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder (6.20 g) of a sulfide solid electrolyte (Li—P—S-based glass).

Example 1

—Preparation of Individual Compositions—

As the organic solvents that were used to prepare the respective compositions (the solid electrolyte compositions, the compositions for a positive electrode, and the compositions for a negative electrode), super dehydrated products (moisture content: 1 ppm or less) were used.

—Preparation of Solid Electrolyte Composition—

(1) Preparation of Solid Electrolyte Composition (K-1)

180 zirconia beads having a diameter of 5 mm were injected into a 45 mL zirconia container (manufactured by Fritsch Japan Co., Ltd.), and an oxide-based inorganic solid electrolyte LLZ ($Li_7La_3Zr_2O_{12}$, lithium lanthanum zirconate, volume-average particle diameter: 5.06 μm, manufactured by Toshima. Manufacturing Co., Ltd.) (9.0 g), the linear structure dispersion (B-1) prepared above (solid content concentration: 0.5%) (3.0 g), and dibutyl ether (15.0 g) as an organic solvent were injected thereinto. After that, the container was set in a planetary ball mill P-7 (trade name, manufactured by Frisch Japan. Co., Ltd.), the components were continuously stored at a temperature of 25° C. and a rotation speed of 300 rpm for two hours, thereby preparing a solid electrolyte composition (K-1).

(2) Preparation of Solid Electrolyte Composition (K-2)

180 zirconia beads having a diameter of 5 mm were injected info a 45 mL zirconia container (manufactured by Fritsch Japan Co., Ltd.), and the sulfide-based inorganic solid electrolyte Li—P—S-based glass synthesized above (9.0 g), the linear structure dispersion (B-1) prepared above (solid content concentration: 0.5%) (3.0 g), and dibutyl ether (15.0 g) as an organic solvent were injected thereinto. After that, the container was set in a planetary ball mill P-7 (trade name, manufactured by Frisch Japan Co., Ltd.), the components were continuously stirred at a temperature of 25° C. and a rotation speed of 300 rpm for two hours, thereby preparing a solid electrolyte composition (K-2).

(3) Manufacturing of Solid Electrolyte Compositions (K-3) to (K-7) and (HK-1)

Solid electrolyte compositions (K-3) to (K-7s and (HK-1) were manufactured using the same method as for the solid electrolyte compositions (K-1) and (K-2) except for the fact that the compositions were changed as shown in Table 2.

The compositions of the solid electrolyte compositions are summarized in Table 2.

Here, the solid electrolyte compositions (K-1) to (K-7) are the solid electrolyte composition of the present invention, and the solid electrolyte composition (HK-1) is a comparative solid electrolyte composition.

TABLE 2

| Solid electrolyte composition | Linear structure dispersion Kind | Linear structure dispersion Parts by mass | Solid electrolyte Kind | Solid electrolyte Parts by mass | Binder Kind | Binder Parts by mass | Organic solvent Kind | Organic solvent Parts by mass |
|---|---|---|---|---|---|---|---|---|
| K-1 | B-1 | 3.0 | LLZ | 9.0 | — | — | Dibutyl ether | 15.0 |
| K-2 | B-1 | 3.0 | Li—P—S | 9.0 | — | — | Dibutyl ether | 15.0 |
| K-3 | B-3 | 3.0 | Li—P—S | 9.0 | — | — | Diisobutyl ketone | 15.0 |
| K-4 | B-4 | 5.0 | Li—P—S | 9.0 | C-1 | 0.3 | Heptane | 15.0 |
| K-5 | B-6 | 10.0 | Li—P—S | 9.0 | C-3 | 0.3 | Toluene | 15.0 |
| K-6 | B-7 | 10.0 | Li—P—S | 9.0 | C-1<br>C-5 | 0.1<br>0.2 | Heptane | 15.0 |
| K-7 | B-8 | 15.0 | Li—P—S | 9.0 | C-1<br>C-6 | 0.1<br>0.3 | Heptane | 15.0 |
| HK-1 | — | — | Li—P—S | 9.0 | C-1 | 0.5 | Heptane | 15.0 |

<Notes of table>
B-1, 3, 4, 6, 7, 8: Linear structure dispersions prepared above (refer to Table 1)
LLZ: $Li_7La_3Zr_2O_{12}$ (lithium lanthanum zirconate, average particle diameter: 5.06 μm, manufactured by Toshima Manufacturing Co., Ltd.)
Li—P—S: Li—P—S-based glass synthesized above
C-1: Polyvinylidene fluoride-hexafluoropropylene copolymer (PVdF-HFP) manufactured by Arkema K.K., mass average molecular weight: 100,000
C-3: MICRODISPERSER 200 (trade name, PTFE particles, average particle diameter: 0.2 μm, manufactured by Techno Chemical Corp.)
C-5: ART-PEARL P-800T (trade name, polyurethane particles, average particle diameter: 6 μm, manufactured by Negami Chemical Industrial Co., Ltd.)
C-6: Acrylic latex particles (B-1) described in WO2015/046314A, average particle diameter: 0.198 μm —Preparation of Composition for Positive Electrode—

(1) Preparation of Composition for Positive Electrode (U-1)

180 zirconia beads having a diameter of 5 mm were injected into a 45 mL zirconia container (manufactured by Fritsch Japan Co., Ltd.), and the sulfide-based inorganic solid electrolyte Li—P—S-based glass synthesized above (2.7 g), the linear structure dispersion (B-2) (solid content concentration: 0.5%) prepared above (10.0 g). SEPOLEX IR100 (trade name, polyisoprene latex, manufactured by Sumitomo Seika Chemicals Co., Ltd.) (0.2 g) as a binder, and heptane (8.5 g) as an organic solvent were injected thereinto. The container was set in a planetary ball mill P-7 (manufactured by Fritsch Japan Co., Ltd.), mechanical dispersion was continued at a temperature of 25° C. and a rotation speed of 300 rpm for two hours, then, NMC (7.0 g) was injected as a positive electrode active material into the container, similarly, the container was set in the planetary ball mill P-7, and the components were continuously mixed at a temperature of 25° C. and a rotation speed of 100 rpm for 15 minutes, thereby preparing a composition for a positive electrode (U-1).

(2) Preparation of Compositions for Positive Electrode (U-2) to (U-6) and (HU-1)

Compositions for a positive electrode (U-2) to (U-6) and (HU-1) were prepared using the same method for the composition for a positive electrode (U-1) except for the fact that the compositions were changed as shown in Table 3.

The compositions of the impositions for a positive electrode are summarized in Table 3.

Meanwhile, the compositions for a positive electrode (U-1) to (U-6) are the composition for a positive electrode of the present invention, and the composition for a positive electrode (HU-1) is a comparative composition for a positive electrode.

TABLE 3

| Composition for positive electrode | Linear structure dispersion Kind | Linear structure dispersion Parts by mass | Solid electrolyte Kind | Solid electrolyte Parts by mass | Binder Kind | Binder Parts by mass | Positive electrode active material Kind | Positive electrode active material Parts by mass | Organic solvent Kind | Organic solvent Parts by mass |
|---|---|---|---|---|---|---|---|---|---|---|
| U-1 | B-2 | 10.0 | Li—P—S | 2.7 | C-4 | 0.2 | NMC | 7.0 | Heptane | 8.5 |
| U-2 | B-5 | 15.0 | Li—P—S | 2.7 | C-5 | 0.2 | NMC | 7.0 | Heptane | 8.5 |
| U-3 | B-6 | 20.0 | Li—P—S | 2.7 | C-1 | 0.2 | LCO | 7.0 | Octane | 8.5 |
| U-4 | B-7 | 25.0 | Li—P—S | 2.7 | C-3 | 0.2 | NMC | 7.0 | Octane | 7.0 |
| U-5 | B-8 | 10.0 | Li—P—S | 2.7 | C-4 | 0.2 | NMC | 7.0 | Heptane | 9.0 |
| U-6 | B-9 | 10.0 | Li—P—S | 2.7 | C-5 | 0.2 | NMC | 7.0 | Heptane | 8.5 |
| HU-1 | — | — | Li—P—S | 2.7 | C-2 | 0.5 | NMC | 7.0 | Heptane | 12.3 |

<Notes of table>
B-2, 9: Linear structure dispersions prepared above (refer to Table 1)
C-2: Styrene butadiene rubber (SBR) manufactured by Aldrich-Sigma, Co. LLC., mass average molecular weight: 150,000
C-4: SEPOLEX IR100 (trade name, polyisoprene latex, manufactured by Sumitomo Seika Chemicals Co., Ltd., mass average molecular weight: 150,000)
LCO: $LiCoO_2$, lithium cobaltate
NMC: $LiNi_{0.33}Co_{0.33}Mn_{0.33}O_2$, lithium nickel manganese cobalt oxide —Preparation of Compositions for Negative Electrode—

(1) Preparation of Composition for Negative Electrode (S-1)

180 zirconia beads having a diameter of 5 mm were injected into a 45 mL zirconia container (manufactured by Fritsch Japan Co., Ltd.), and the sulfide-based inorganic solid electrolyte Li—P—S-based glass synthesized above (5.0 g), the linear structure dispersion (B-2) (solid content concentration: 0.5%) prepared above (30.0 g) and heptane (3.5 g) as an organic solvent were injected thereinto. The container was set in a planetary ball mill P-7 (manufactured by Fritsch Japan Co., Ltd.), mechanical dispersion was continued at a temperature of 25° C. and a rotation speed of 300 rpm for two hours, then, AB (7.0 g) was injected as a negative electrode active material into the container, similarly, the container was set in the planetary ball mill P-7, and the components were continuously mixed at a temperature of 25° C. and a rotation speed of 100 rpm for 15 minutes, thereby preparing a composition for a negative electrode (S-1).

(2) Preparation of Compositions for Negative Electrode (S-2) to (S-6) and (HS-1) and (HS-2)

Compositions for a negative electrode (S-2) to (S-6) and (HS-1) and (HS-2) were prepared using the same method for the composition for a negative electrode (S-1) except for the fact that the compositions were changed as shown in Table 4.

The compositions of the compositions for a negative electrode are summarized in Table 4.

Here, the compositions for a negative electrode (S-1) to (S-6) are the composition for a negative electrode of the present invention, and the compositions for a negative electrode (HS-1) and (HS-2) are comparative compositions for a negative electrode.

using an applicator having an adjustable clearance, heated at 80° C. for one hour, and then further heated at 100° C. one hour, and the coating solvent was dried. After that, the composition was heated and pressurized (300 MPa for one minute) using a heat pressing machine, thereby obtaining a 150 μm-thick positive electrode sheet for a secondary battery having a laminate structure of the positive electrode active material layer/the aluminum foil.

—Manufacturing of All-solid State Secondary Batteries—

The solid electrolyte composition prepared above was applied onto the positive electrode sheet for a secondary battery manufactured above using an applicator having an adjustable clearance, heated at 80° C. for one hour, and then further heated at 110° C. for one hour, thereby forming a 50 μm-thick solid electrolyte layer. After that, the composition for a negative electrode prepared above was further applied onto the dried solid electrolyte composition, heated at 80° C. for one hour, and then further heated at 110° C. for one hour, thereby forming a 100 μm-thick negative electrode active material layer. A 20 μm-thick copper foil was overlaid on the negative electrode active material layer, the solid electrolyte layer and the negative electrode active material layer were heated and pressurized (300 MPa for one minute) using a heat pressing machine, thereby manufacturing Test Nos 101 to 110 and e11 and e12 of all-solid state secondary batteries shown in Table 5.

The all-solid state secondary batteries have the layer constitution of FIG. 1 and have a laminate structure of the copper foil/the negative electrode active material layer/the inorganic solid electrolyte layer/the positive electrode sheet for a secondary battery (the positive electrode active material layer/the aluminum foil). The positive electrode active material layer, the negative electrode active material layer,

TABLE 4

| Composition for negative electrode | Linear structure dispersion | | Solid electrolyte | | Binder | | Negative electrode active material | | Organic solvent | |
|---|---|---|---|---|---|---|---|---|---|---|
| | Kind | Parts by mass | Kind | Parts by mass | Kind | Parts by mass | Kind | Parts by mass | Kind | Parts by mass |
| S-1 | B-2 | 30.0 | Li—P—S | 5.0 | — | — | AB | 7.0 | Heptane | 3.5 |
| S-2 | B-3 | 30.0 | Li—P—S | 5.0 | — | — | AB | 7.0 | Heptane | 3.5 |
| S-3 | B-4 | 15.0 | Li—P—S | 5.0 | — | — | AB | 7.0 | Heptane | 3.5 |
| S-4 | B-5 | 15.0 | Li—P—S | 5.0 | C-1 | 0.2 | AB | 7.0 | Heptane | 4.0 |
| S-5 | B-6 | 15.0 | Li—P—S | 5.0 | C-3 | 0.2 | AB | 7.0 | Octane | 5.0 |
| S-6 | B-9 | 15.0 | Li—P—S | 5.0 | C-4 | 0.2 | AB | 7.0 | Octane | 3.5 |
| HS-1 | — | — | Li—P—S | 5.0 | C-1 | 0.2 | AB | 7.0 | Heptane | 12.3 |
| HS-2 | — | — | Li—P—S | 5.0 | C-4 | 0.1 | AB | 7.0 | Heptane | 12.3 |

<Notes of table>
B-5: Linear structure dispersion prepared above
AB: Acetylene black (Moisture Content of Individual Compositions)

The moisture contents of the respective compositions prepared above were measured using the Karl Fischer's method in the same manner as in the measurement of the moisture content of the linear structure dispersion.

The moisture contents of the solid electrolyte compositions (K-1) to (K-7), the compositions for a positive electrode (U-1) to (U-6), and the compositions for a negative electrode (S-1) to (S-6) were all 5 ppm or less.

—Production of Positive Electrode Sheet for Secondary Battery—

The composition for a positive electrode prepared above was applied onto a 20 μm-thick aluminum foil (a collector)

and the inorganic solid electrolyte layer were produced so as to have film thicknesses of 150 μm, and 50 μm respectively and were prepared so that the film thicknesses varied in a range of the above-described film thickness±10% in all of the all-solid state secondary batteries.

Figure 2:
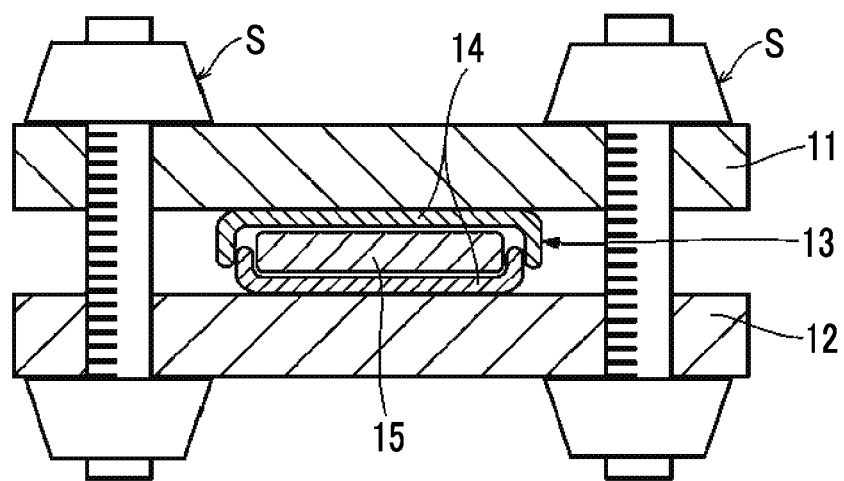
FIG. 2 is a vertical cross-sectional view schematically illustrating a testing device used in examples.

A disc-shaped piece having a diameter of 14.5 mm was cut out from the all-solid state secondary battery 15 manufactured above, put into a 2032-type stainless steel coin case 14 into which a spacer and a washer were combined, and tightened by exerting a force of eight newton (N) with a torque wrench from the outside of the coin case 14 using a testing body illustrated in FIG. 2, thereby manufacturing an all-solid state secondary battery (coin battery) 13 of Test No.

101 having a form in which the all-solid state secondary battery having the structure illustrated in FIG. 1 was accommodated in the coin case. Meanwhile, in FIG. 2, reference sign 11 indicates an upper portion-supporting plate, reference sign 12 indicates a lower portion-supporting plate, and reference sign S indicates a spring.

<Evaluation>

On the all-solid state secondary batteries of No. 101 to 110 and c11 and c12 of the present invention manufactured above, the following evaluations were carried out.

<Evaluation of Battery Voltage>

The battery voltage of the all-solid state secondary battery manufactured above was measured using a charging and discharging evaluation device "TOSCAT-3000 (trade name)" manufactured by Toyo System Co., Ltd.

The coin battery was charged at a current density of 2 A/m2 until the battery voltage reached 4.2 V, and, once the battery voltage reached 4.2 V, the coin battery was charged with constant voltage until the current-density reached less than 0.2 A/m$^2$. The coin battery was discharged at a current density of 2 A/m$^2$ until the battery voltage reached 3.0 V. The above-described process was considered as one cycle, and the battery voltage after a 5 mAh/g discharging in the third cycle was read and evaluated using the following standards. Meanwhile, the evaluation rankings of "C" or higher are the passing levels of the present testing.

(Evaluation Standards)
A: 4.1 V or more
B: 4.0 V or more and less than 4.1 V
C: 3.9 V or more and less than 4.0 V
D: 3.8 V or more and less than 3.9 V
E: Less than 3.8 V <Evaluation of Cycle Characteristics>

The cycle characteristics of the all-solid state secondary battery manufactured above were measured using a charging and discharging evaluation device "TOSCAT-3000 (trade name)" manufactured by Toyo System Co., Ltd.

The all-solid state secondary battery was charged and discharged under the same conditions as those in the battery voltage evaluation. The discharge capacity in the third cycle was considered as 100, and the cycle characteristics were evaluated using the following standards from the number of times of the cycle when the discharge capacity reached less than 80. Meanwhile, the evaluation rankings of "C" or higher are the passing levels of the present testing.

(Evaluation Standards)
A: 50 times or more
B: 40 times or more and less than 50 times
C: 30 times or more and less than 40 times
D: 20 times or more and less than 30 times
E: Less than 20 times The constitutions and evaluation results of the electrode sheets for an all-solid state secondary battery and the all-solid state secondary batteries are summarized in Table 5. Here, Test Nos. 101 to 110 are the electrode sheet for an all-solid state secondary battery and the all-solid state secondary battery of the present invention, and Test Nos. c11 and c12 are comparative electrode sheets for an all-solid state secondary battery and comparative all-solid state secondary batteries.

Meanwhile, in Table 5, battery voltage is abbreviated as voltage.

TABLE 5

| Test No. | Composition for positive electrode | Solid electrolyte composition | Composition for negative electrode | Battery evaluation Voltage | Cycle characteristics | Remark |
|---|---|---|---|---|---|---|
| 101 | HU-1 | K-2 | S-1 | C | C | Present Invention |
| 102 | U-2 | K-3 | HS-1 | C | B | Present Invention |
| 103 | U-3 | HK-1 | S-3 | A | B | Present Invention |
| 104 | U-4 | K-5 | S-4 | B | A | Present Invention |
| 105 | U-5 | K-6 | S-5 | A | A | Present Invention |
| 106 | U-6 | K-7 | S-6 | A | B | Present Invention |
| 107 | U-2 | K-3 | S-5 | A | A | Present Invention |
| 108 | U-3 | K-4 | S-5 | A | A | Present Invention |
| 109 | U-6 | K-5 | S-6 | B | B | Present Invention |
| 110 | U-5 | K-6 | S-6 | A | B | Present Invention |
| c11 | HU-1 | HK-1 | HS-1 | D | E | Comparative Example |
| c12 | HU-1 | HK-1 | HS-2 | E | D | Comparative Example |

As is clear from Table 5, it is found that the all-solid state secondary batteries of Test Nos. 101 to 110 of the present invention had a low resistance and excellent cycle characteristics.

In contrast, the comparative all-solid state secondary batteries of Test Nos. c11 and c12 manufactured using the composition for a positive electrode, the solid electrolyte composition, and the composition for a negative electrode which did not have the linear structures regulated by the present invention were unsatisfactory in terms of both resistance and cycle characteristics.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrolyte active material layer
5: positive electrode collector
6: operation portion
10: all-solid state secondary battery
11: upper portion-supporting plate
12: lower portion-supporting plate
13: coin battery
14: coin case 15: all-solid state secondary battery
S: screw

What is claimed is:

1. A solid electrolyte composition comprising:
an inorganic solid electrolyte having ion conductivity of ions of metals belonging to Group I or II of the periodic table;
linear structures having an average diameter of 0.001 to 1 μm, an average length of 0.1 to 150 μm, a ratio of the average length to the average diameter of 10 to 100,000, and an electric conductivity of $1 \times 10^{-6}$ S/m or less; and
an organic solvent,
wherein the inorganic solid electrolyte contains, as elements, at least Li, S and P,
wherein a surface of at least one linear structure is coated with a polymer having a different structure from a central portion, and
the polymer is at least one polymer selected from the group consisting of acrylic resins, urethane resins, amide resins, urea resins, imide resins, ester resins, silicone resins, hydrocarbon resins, ether resins, carbonate resins, and fluorine-containing resins, and
wherein the organic solvent is at least one kind of an organic solvent selected from the group consisting of a hydrocarbon-based solvent, an ether compound solvent, a ketone compound solvent, an ester compound solvent, and a nitrile compound solvent, and the number of carbon atoms is four or more in all of the organic solvents.

2. The solid electrolyte composition according to claim 1, wherein the at least one linear structure contains a nanofiber or a nanowire made of any one selected from the group consisting of organic substances, carbon, metal, ceramic, and glass.

3. The solid electrolyte composition according to claim 1, wherein the at least one linear structure contains a cellulose nanofiber.

4. The solid electrolyte composition according to claim 1, wherein a boiling point of at least one organic solvent is 100° C. or higher.

5. The solid electrolyte composition according to claim 1, further comprising:
polymer particles,
wherein an average particle diameter φ of the polymer particles and an average length L of the linear structures satisfy a relationship represented by Expression (A), $$L/1{,}000 \leq \phi < L \qquad \text{Expression (A)}.$$

6. The solid electrolyte composition according to claim 5, wherein a total mass $W_B$ of the linear structures and a total mass $W_D$ of the polymer particles satisfy a relationship represented by Expression (B), $$W_B/10 < W_D < 20 \times W_B \qquad \text{Expression (B)}.$$

7. The solid electrolyte composition according to claim 1, wherein the surface of the at least one linear structure and the polymer coating the surface of the at least one linear structure are bonded to each other through a covalent bond.

8. The solid electrolyte composition according to claim 1, wherein a content ratio of the linear structures is 0.1% to 20% by mass of all solid components.

9. The solid electrolyte composition according to claim 1, further comprising:
an electrode active material.

10. A method for manufacturing an electrode sheet for an all-solid state secondary battery, the method comprising:
applying a wet slurry of the solid electrolyte composition according to claim 1 onto a metal foil, a positive electrode active material layer, or a solid electrolyte layer.

11. A method for manufacturing an all-solid state secondary battery, the method comprising:
manufacturing an all-solid state secondary battery having a positive electrode active material layer, a solid electrolyte layer, and a negative electrode active material layer in this order through the manufacturing method according to claim 10.

* * * * *